United States Patent
Drewniak et al.

(10) Patent No.: US 11,104,587 B2
(45) Date of Patent: Aug. 31, 2021

(54) SYSTEM AND METHOD FOR AUTOMATED CONTROL, FEED, DELIVERY VERIFICATION, AND INVENTORY MANAGEMENT OF CORROSION AND SCALE TREATMENT PRODUCTS FOR WATER SYSTEMS

(71) Applicant: NCH Corporation, Irving, TX (US)

(72) Inventors: Marta Drewniak, Carrollton, TX (US); Lyle H. Steimel, Flower Mound, TX (US); James Victor List, Irving, TX (US); Cory J. Holder, Irving, TX (US); Scott M. Boyette, Irving, TX (US)

(73) Assignee: NCH Corporation, Irving, TX (US)

( * ) Notice: Subject to any disclaimer, the term of this patent is extended or adjusted under 35 U.S.C. 154(b) by 496 days.

(21) Appl. No.: 15/908,163

(22) Filed: Feb. 28, 2018

(65) Prior Publication Data

US 2018/0186656 A1   Jul. 5, 2018

Related U.S. Application Data

(63) Continuation-in-part of application No. 15/634,416, filed on Jun. 27, 2017, which is a continuation-in-part
(Continued)

(51) Int. Cl.
*C02F 1/00* (2006.01)
*C02F 5/12* (2006.01)
(Continued)

(52) U.S. Cl.
CPC .............. *C02F 1/008* (2013.01); *C02F 1/685* (2013.01); *C02F 5/125* (2013.01); *C02F 5/145* (2013.01);
(Continued)

(58) Field of Classification Search
CPC .. C02F 1/008; C02F 1/685; C02F 1/50; C02F 1/00; C02F 1/68; C02F 5/125;
(Continued)

(56) References Cited

U.S. PATENT DOCUMENTS 2,333,206 A   11/1943  Sloan
4,101,328 A   7/1978   Fieser et al.
(Continued)

FOREIGN PATENT DOCUMENTS

CA   2252044   10/1997
CN   1603252   4/2005
(Continued)

OTHER PUBLICATIONS

Keister, Timothy et al., Cooling Water Management Basic Principals and Technology, Prochemtech International, Inc., pp. 1-32, https://www.prochemtech.com/Literature/Technical/Basic_Cooling_Water_Management_II.pdf retrieved Oct. 4, 2018.
(Continued)

*Primary Examiner* — Robert Clemente
*Assistant Examiner* — Akash K Varma
(74) *Attorney, Agent, or Firm* — Scheef & Stone, LLP; Robin L. Barnes

(57) ABSTRACT

A system and method of controlling the treatment of water systems comprises multiple feeders for separately feeding treatment products, in the form of concentrated, non-hazardous, liquids with a single active ingredient, to a water system to treat various issues, such as corrosion and biofilms. A sensor verifies delivery of the treatment product to the water system. A controller controls activation of each feeder to control a feed rate according to programmed functions. The controller receives signals from sensors, which can be used as inputs in calculating feed rates or feeder activation times according to the programed functions
(Continued)

and can alter treatment product feed rates based on real time data regarding water system chemistry or flow rates. The controller can send and receive data, signals, alerts, alarms or changes in programming to or from remote users, remote computers, or a water system controller.

47 Claims, 11 Drawing Sheets

Related U.S. Application Data of application No. 15/273,158, filed on Sep. 22, 2016, now Pat. No. 10,351,453.

(60) Provisional application No. 62/322,616, filed on Apr. 14, 2016, provisional application No. 62/363,574, filed on Jul. 18, 2016.

(51) Int. Cl.
- *C02F 5/14* (2006.01)
- *C02F 1/50* (2006.01)
- *C02F 1/68* (2006.01)
- *C02F 103/02* (2006.01)

(52) U.S. Cl.
CPC .......... C02F 1/50 (2013.01); C02F 2103/023 (2013.01); C02F 2209/003 (2013.01); C02F 2209/006 (2013.01); C02F 2209/05 (2013.01); C02F 2209/40 (2013.01); C02F 2209/44 (2013.01); C02F 2303/04 (2013.01); C02F 2303/08 (2013.01); C02F 2303/20 (2013.01); C02F 2303/22 (2013.01)

(58) Field of Classification Search
CPC .... C02F 5/145; C02F 5/04; C02F 5/14; C02F 5/12; C02F 2103/023; C02F 2209/003; C02F 2209/006; C02F 2209/05; C02F 2209/40; C02F 2209/44; C02F 2303/04; C02F 2303/08; C02F 2303/20; C02F 2303/22
USPC ........................................................ 210/695
See application file for complete search history.

(56) References Cited

U.S. PATENT DOCUMENTS

| | | |
|---|---|---|
| 4,659,459 A | 4/1987 | O'Leary et al. |
| 4,719,083 A | 1/1988 | Baker et al. |
| 4,915,939 A | 4/1990 | Iwahashi |
| 4,971,724 A | 11/1990 | Kalota et al. |
| 5,062,962 A | 11/1991 | Brown et al. |
| 5,120,661 A | 6/1992 | Baker et al. |
| 5,242,602 A | 9/1993 | Richardson et al. |
| 5,294,371 A | 3/1994 | Clubley et al. |
| 5,294,916 A | 3/1994 | Bolton et al. |
| 5,407,597 A | 4/1995 | Busch et al. |
| 5,523,023 A | 6/1996 | Kleinstuck et al. |
| 5,525,257 A | 6/1996 | Kleinstuck et al. |
| 5,531,934 A | 7/1996 | Freeman et al. |
| 5,562,830 A | 10/1996 | Zidovec et al. |
| 5,707,529 A | 1/1998 | Gill et al. |
| 5,800,732 A | 9/1998 | Coughlin et al. |
| 5,866,032 A | 2/1999 | Carey et al. |
| 6,090,345 A | 7/2000 | Holzner et al. |
| 6,183,649 B1 | 2/2001 | Fontana |
| 6,207,079 B1 | 3/2001 | Kmec et al. |
| 6,277,302 B1 | 8/2001 | Fan et al. |
| 6,402,957 B1 | 6/2002 | Boyce |
| 6,447,717 B1 | 9/2002 | Fan et al. |
| 6,464,900 B1 | 10/2002 | Kmec et al. |
| 6,468,470 B1 | 10/2002 | Oldsberg et al. |
| 6,503,400 B2 | 1/2003 | Kmec et al. |
| 6,572,789 B1 | 6/2003 | Yang et al. |
| 6,585,933 B1 | 7/2003 | Ehrhardt et al. |
| 6,814,930 B1 | 11/2004 | Oldsberg et al. |
| 7,178,742 B2 | 2/2007 | Mellentine et al. |
| 7,851,655 B2 | 12/2010 | Kidambi |
| 7,910,024 B2 | 3/2011 | Stapp et al. |
| 7,935,274 B2 | 5/2011 | Schlosser |
| 8,496,847 B2 | 7/2013 | Keister |
| 8,585,964 B2 | 11/2013 | Sotoudeh et al. |
| 9,290,850 B2 | 3/2016 | Erickson et al. |
| 9,834,452 B1 | 12/2017 | Fuller et al. |
| 10,765,999 B2 | 9/2020 | Rao et al. |
| 2007/0001150 A1 | 1/2007 | Huclgens et al. |
| 2007/0152355 A1 | 7/2007 | Hartley |
| 2010/0137174 A1 | 6/2010 | Maeda et al. |
| 2010/0176060 A1 | 7/2010 | Duarte et al. |
| 2010/0178197 A1 | 7/2010 | Sotoudeh et al. |
| 2011/0082595 A1* | 4/2011 | Mehus .................... B67D 7/02 700/283 |
| 2013/0233796 A1* | 9/2013 | Rao .......................... C02F 1/008 210/639 |
| 2013/0239991 A1* | 9/2013 | Denvir ..................... C11D 1/29 134/10 |
| 2015/0004054 A1 | 1/2015 | Richardson et al. |
| 2015/0118103 A1 | 4/2015 | Erickson et al. |
| 2016/0115061 A1 | 4/2016 | Ukai et al. |
| 2016/0354727 A1 | 12/2016 | Denvir et al. |

FOREIGN PATENT DOCUMENTS

| | | |
|---|---|---|
| CN | 1743282 | 3/2006 |
| CN | 1273393 | 9/2006 |
| CN | 102718333 | 10/2012 |
| CN | 102838216 | 12/2012 |
| CN | 103319010 | 9/2013 |
| CN | 103710712 | 4/2014 |
| CN | 105948283 | 9/2016 |
| CN | 106315880 | 1/2017 |
| EP | 0161844 | 11/1985 |
| WO | WO9401486 | 1/1994 |
| WO | WO9728231 | 8/1997 |
| WO | WO2017180328 | 10/2017 |

OTHER PUBLICATIONS

Koken, Mustafa Emrah, Comprehensive solutions for your water systems, published Sep. 2009 by BKG Water Solutions; retrieved from the internet on Dec. 14, 2016, http://www.hitech-envir.com/BKG_Water.pdf.

Chem-Aqua 31155 Material Safety Data Sheet, published Jun. 3, 2013 by Chem-Aqua, retrieved from the Internet on Dec. 14, 2016, https://webpirs.nch.com/msds/msdsview.aspx?cn=CAN&co=AQ&gn=C777&sn=CHEM-AQUA+31155&ln=en.

BK Giulini Safety Data Sheet on Cetamine V217S, published Sep. 27, 2010 by BK Giulini.

Cetamine V217 S Spec Sheet, BKG Water Solutions, published/revision Aug. 20, 2010 by BKG Water Solutions, bkgwater.com.

Betova et al. Film-Forming Amines in Steam/Water Cycles—structure, properties, and influence on corrosion and deposition processes. Research Report No VTT-R 03234-14; published Jul. 7, 2014 by VTT Technical Research Centre of Finland.

CHEM-AQUA. Material Safety Data Sheet: CHEM-AQUA 15000 MT, Published Jul. 17, 2014 by Chem-Aqua; https://webpirs.nch.com/msds/msdsview.aspx?cn=USA&co=CA&gn=775C&sn=CHEM-AQUA+15000MT+&ln=en.

Ochoa et al. The Synergistic Effect Between Phosphonocarboxylic Acid Salts and Fatty Amines for the Corrosion Protection of a Carbon Steel. Journal of Applied Electrochemistry vol. 34 Issue 5: 487-493, published May 2004 by Kluwer Academic Publishers, Netherlands.

BKG Water Solutions. Product Information Cetamine V217. Publication/revision date Mar. 12, 2009; retrieved from the internet on Dec. 14, 2016, http://www.burla.co.Il/files/TDS_CETAMINE_V_217.pdf.

(56) References Cited

OTHER PUBLICATIONS

Karen, The Pursuit of a Green Carbon Steel Corrosion Inhibitor: Laying the Groundwork, Online Article retrieved from the internet on Aug. 18, 2016, published Nov. 8, 2014, pp. 1-6, US Water Services, Minnesota, USA; http://www.uswaterservices.com/news/2014/11/the-pursuit-of-a-green-carbon-steel-corrosion-inhibitor-laying-the-groundwork/.

Frayne, CWT, Aquassurance, Inc., Organic Water Treatment Inhibitors; Expansion of Current Guidelines, Myths, Disinformation, and the Next Generation of Novel Chemistries—Part II, Article, The Analyst, vol. 16, No. 4, pp. 24-33, published Fall 2009; retrieved from the internet on Dec. 14, 2016, https://www.cortecvci.com/Publications/Papers/Watertreatment/OrganicWTInhibitors.pdf.

Langelier and Aggressive Indices, 2014 [retrieved from the Internet: URL:https://stpnq.com/wp-content/uploads/2014/08/Langelier-index.pdf.

Reclamation Managing Water in the West, Water Chemistry Analysis for Water Conveyance, Storage, and Desalination Projects, US Dept. Interior, Aug. 2013.

\* cited by examiner

Conductivity readings of equivalent dilutions of Components fed at 1.8ml/minute feed in 3-gpm (left bar) and 6-gpm (right bar) flow streams.

| Test | Carbon Steel Coupon | |
|---|---|---|
| | Flow Rate = 3ft/sec | Flow Rate = 5ft/sec |
| Control (no treatment) |  |  |
| Example 1 |  |  |
| Example 2 |  | 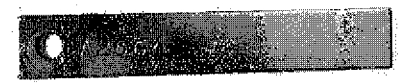 |
| Example 3 |  |  |
| Example 4 |  |  |
| Example 5 |  |  |
| Example 6 |  |  |
| Example 7 |  |  |
| Comp. Ex. 8 |  |  |
| Comp. Ex. 9 |  |  |
*FIG. 8*

| Test | Carbon Steel Coupon | |
|---|---|---|
| | Flow Rate = 3ft/sec | Flow Rate = 5ft/sec |
| Example 2 |  |  |
| Example 3 |  |  |
| Example 4 |  | 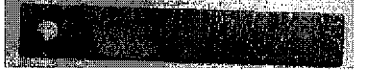 |
| Comp. Ex. 7 |  |  |
*FIG. 9*

| Test | Galvanized Coupon | |
|---|---|---|
| | Before Cleaning | After Cleaning |
| Comp. Ex. 22 No Inhibitor | | |
| Example 23 | | |
| Example 24 | | |
| Example 25 | | |
| Example 26 | | |

FIG. 11

SYSTEM AND METHOD FOR AUTOMATED CONTROL, FEED, DELIVERY VERIFICATION, AND INVENTORY MANAGEMENT OF CORROSION AND SCALE TREATMENT PRODUCTS FOR WATER SYSTEMS

CROSS-REFERENCE TO RELATED APPLICATION

This application is a continuation-in-part of U.S. application Ser. No. 15/634,416 filed on Jun. 27, 2017, which is a continuation-in-part of U.S. application Ser. No. 15/273,158 filed on Sep. 22, 2016, which claims the benefit of U.S. Provisional Application Ser. No. 62/322,616 filed on Apr. 14, 2016 and U.S. Provisional Application Ser. No. 62/363,574 filed on Jul. 18, 2016.

BACKGROUND OF THE INVENTION

1. Field of the Invention

This invention relates to a system and method for controlling the treatment of water in a water system, such as industrial process water, cooling tower water, and boilers, with various treatment products, particularly by feeding individual or combined, undiluted raw materials treatment products each having one active ingredient that when combined in the water system are effective at inhibiting corrosion or white rust on metal components in low LSI (Langelier Saturation Index) water systems and for inhibiting scale formation in high LSI water systems and treating other water system issues, using automated control of feed time and amount for each individual treatment component, optional delivery verification, and optional treatment product inventory management, to maintain system cycles and water chemistry in the water system.

2. Description of Related Art

Industrial and other anthropogenic water systems require some form of treatment, either chemical or non-chemical, to control the build-up of scale, biofilm and other corrosion by-products on components of the water system. For water systems involving heat exchange, such as cooling towers, effective treatment to remove these contaminants and to prolong the amount of time before the systems are re-contaminated can save significant amounts of money. An effective and thorough treatment may save costs for labor and treatment chemicals by reducing the frequency of periodic treatments or reducing the amount of chemicals needed for routine maintenance and/or periodic treatments. Such a treatment may also save on energy costs through the operation of clean heat exchange surfaces.

To maximize the water usage and minimize waste, many water systems employ a series of chemical treatments that protect the system against scaling, biofilm formation, and corrosion. In order to properly maintain the water system, it is important to be able to control the amount of treatment products introduced into the water system and the concentration of those products as the water moves through or recirculates through the water system to understand the rate of treatment consumption and/or discharge through blow-down. Proper control of treatment products is particularly important in recirculating water systems where scale and biofilm buildup reduce the number of times water may be recirculated (cycles) before some of the water needs to be bled-off and replaced with make-up water or before the conductivity of the water reaches a level that triggers automatic blowdown. That blowdown may result in draining treatment products before they have been consumed or before they have had a chance to circulate long enough to be effective, requiring the addition of more treatment product to maintain desired concentration levels of treatment products in the water system.

Many treatment products are fed from diluted multi-component formulations shipped in large containers or drums, the weight and size of which makes freight and delivery more expensive and movement from delivery area to storage area to the treatment feed location more difficult and potentially dangerous. Some water system treatments are sold and shipped in solid form, to be dissolved at the treatment site. For example, U.S. Patent Application Publication No. 2013/0239991 discloses a solid treatment product feeder system where water is taken from the water system to be treated via a side stream that dilutes the solid treatment chemicals and is then reintroduced into the water system with the dissolved treatment product. Such a system has the benefit that shipping, storing, and moving the treatment product in solid form is easier than large drums of diluted liquid treatment. However, control over the amount of treatment introduced into the water system is not very precise.

Some treatment products include a dye or fluorescing agent to allow a measurement of the concentration of the treatment product in the water system and to aid in controlling treatment feed rate, which is effective provided the sensor is not fouled. However, a fluorimeter only verifies the presence of the dye or other fluorescing agents, it cannot differentiate between the various components in a multi-component treatment product, which may be required to treat a water system with a variety of treatment products or components in order to address different issues within the water system, such as scale and biofilm development.

It is also known to control operations of a water system, including rates of chemical feed, make-up water, and blow-down, using various control systems. It is also known to use PLC or computer controlled devices to control feed rates of various chemicals or solutions for other purposes. However, it is believed that such systems have not been used to control multi-component treatment of water systems using automated feed, treatment delivery verification, and optionally treatment inventory management, to more precisely control the treatment of a water system.

Various water treatment compositions are used to reduce corrosion, mineral scale, and white rust formation on metal components in contact with an aqueous solution in water systems such as open recirculating systems, closed loop cooling or heating systems, cooling towers and boilers, and help protect the metal components of these systems. The metals typically used in these water systems include ferrous metals, including galvanized steel, aluminum and its alloys, copper and its alloys, lead, and solder. Many known corrosion inhibitors contain regulated toxic metals, such as zinc, chromate, and molybdate, which are harmful to the environment and increase the costs. Zinc is typically used as corrosion inhibitor in water systems with highly corrosive water (low LSI). However its usage is undesirable due to toxicity issues and its use faces regulations in some locations. Tin has also been used as a non-toxic alternative to zinc, but it is more expensive.

The performance of many known corrosion and scale inhibitors is also negatively impacted by the use of biocides, which are frequently used in water systems to control the growth of microorganisms. The use of polyaspartic acid and a single phosphonic acid are disclosed in U.S. Pat. No. 5,523,023 as effective in inhibiting corrosion and scale, even in the presence of a biocide when the phosphonic acid is 2-phosphonobutane-1,2,4-tricarboxylic acid (PBTC). The preferred phosphonic acid in the '023 patent is PBTC, but other phosphonic acids, including 1-hydroxyethane 1,1-disphosphonic acid and hydroxyphosphonoacetic acid (HPA) are also mentioned as suitable. The corrosion rate results shown in the '023 patent based on the use of polyaspartic acid and PBTC are better than other corrosion inhibitors, but there is still a need for even greater corrosion inhibition, particularly in the presence of biocides. The scale formation results shown in the '023 patent based on the use of polyaspartic acid and PBTC are approximately the same as the results obtained by using PBTC alone, indicating no real improvement in scale inhibition is obtained with the two-component formula of the '023 patent.

Currently utilized solutions for white rust prevention include passivating the metal surfaces with zinc carbonate and control of water chemistry to reduce potential for white rust formation. Known treatments include the use of inorganic phosphates, thiocarbamates, organo-phosphorous compounds and tannins. For example, U.S. Pat. Nos. 5,407,597 and 6,468,470 disclose compositions comprising organophosphorus compounds (including PBTC), an alkali metal salt of molybdenum, titanium, tungsten, or vanadium, and either a carbamate compound or a tannin compound. U.S. Pat. No. 6,183,649 discloses a white-rust treatment composition comprising PBTC, sodium polyacrylate, sodium tolytriazole, an alkali metal molybdate, and an alkali metal bromide for treating circulating water systems. The '649 patent also discloses the addition of a 1.5% aqueous solution of decyl thioethyletheramine (DTEA) at a rate of 25lb/1,000 gallons of water/week to the circulating water system prior to adding the white rust treatment composition at a rate of 600 ppm per cycle for ten cycles of recirculation after addition of the DTEA.

Previously known water treatments involve pre-mixed compositions including multiple ingredients that are pre-mixed into a single composition. Most water systems require treatment with several different pre-mixed compositions to address different problems associated with the water system. These different pre-mixed compositions may include some of the same ingredients, which may be wasteful when two or more pre-mixed compositions with the overlapping ingredients are used in the same water system. Additionally, some pre-mixed treatment compositions have ingredients that negatively impact ingredients in other pre-mixed compositions, such as the biocide/corrosion inhibitor issue discussed above. Pre-mixed liquid treatment compositions are frequently used, which involve large volumes of liquids, typically including water. This makes shipping and storage of the treatment costly and difficult. When a pre-mixed composition needs to be replenished, a worker typically has to carry the pre-mixed composition, which may be in a multi-gallon container of significant weight, over distances and/or up one or more flights of stairs to reach a treatment destination.

There is a need for treatment products and a treatment method that can be used to inhibit corrosion, white rust, and scale, along with other issues, such as biological contamination, in a water system using a few ingredients that may be separately added, rather than in a pre-mixed composition. There is also a need for an effective system and method to allow delivery of individual ingredients or small groupings of ingredients that can be fed separately into a water system to control the amount of ingredients fed, the timing of addition for each ingredient to combine synergistic ingredients and aid in avoiding negative interactions, to allow treatment for multiple types of water system issues, and to optionally control inventory management for the treatment ingredients.

SUMMARY OF THE INVENTION

This invention provides a treatment control system and method for treating water in a water system, such as industrial process water, cooling tower water, boilers, closed loops, pasteurizers, and retorts, with various treatment products using automated control of treatment feed, monitoring treatment use, treatment delivery verification, and optional treatment product inventory management, to maintain system cycles and water chemistry in the water system. This invention also provides treatment product to treat a water system to inhibit corrosion, white rust, and scale using ingredients that may be separately added and controlled with preferred embodiments of the treatment control system and method of the invention. According to one preferred embodiment of the invention, an improved corrosion inhibitor, white rust inhibitor, and scale inhibitor products comprise an amino-acid based polymer (AAP), hydroxy-phosphonoacetic acid (HPA) or its water soluble salt, and another phosphonic acid or its water soluble salt, which may be stored separately and added to the water system as separate ingredients.

According to one preferred embodiment, a treatment control system comprises an injection manifold for injecting treatment products into a slip stream or side stream drawn from the water system being treated, one or more containers of treatment product, one or more feeders, such as pumps, to feed treatment product from the containers to the injection manifold or otherwise into the water system, and a controller for activating the feeders to deliver an amount of treatment product needed for the particular water system according to programmed time intervals (programmed timing functions) or programmed calculation or data comparison functions. As used herein, a "treatment product" refers to a single ingredient (or a solution having a single active ingredient) or a pre-mixed composition of two or more active ingredients useful in treating one or more issues associated with water systems, such as biological contamination, corrosion, white rust, or scale. A variety of functions may be pre-programmed into a preferred treatment control system and those programs may be modified by a user as needed to better suit the actual water system operating parameters and actual treatment issues for the water system in which the treatment control system is being used.

According to another preferred embodiment, the treatment system controller comprises processing and telemetry capabilities that allow it to send and receive signals, make calculations, display data, store data and/or save data to a removable memory card or other connected device, and activate/deactivate feed mechanisms for each container of treatment product. A preferred treatment system controller is also capable of automatically sending signals to alter the feed rate of treatment products and accepting manual input of programming changes or manual changes in treatment feed rates. A preferred treatment system controller is also capable of receiving signals from other sensors within the water system, such as pH meter, a flow meter, or an opto-electrochemical sensor, which may be used in calculating treatment product feed rates. The data and information collected and calculated by the treatment system controller may be displayed on an optional screen on the housing for the controller or it may be communicated to a separate or remote control system (such as the water system controller), directly (through a plug-in connection) or by wireless communication, to remote users (such as supervisors or remote operators), to achieve automated control over the water system. Similarly, a computer can talk remotely to the system and prescribe a feed program based on laboratory testing of system samples.

The treatment product chemicals fed into the water system through the treatment control system would provide the needs for scale, corrosion, white rust, and biological inhibition. Prior art treatments are typically fed from diluted multi-component pre-mixed formulations (e.g. one pre-mixed composition that contains chemicals to treat more than one water system issue, such as treating scale and biofilm, or that contains several active ingredients to treat a single product, such as scale) out of large drum containers, such that the precision of the pump becomes less important. However the weight and size of the container complicates shipping, storage, and the movement of the product from storage to the feed location. The treatment products according to one preferred embodiment of the invention are provided as individual, separate components or undiluted mixtures of raw materials (rather than multi-component formulations) in flexible packages in a non-hazardous form. These treatment containers reduce freight, provide easier movement of the product containers to the point of feed, and minimize injuries from carrying and possible chemical contact. Disposal of the containers is simplified because the packaging will be collapsible and preferably more biodegradable. The chemical feed pumps are designed to maintain prime, and the device will monitor pump times to notify personnel when the container will need replacement with a full container.

According to another preferred embodiment, a treatment control system also comprises a sensor, such as a conductivity meter, for verifying delivery of a treatment product into the water system. The sensor is placed downstream of the treatment product feed point, such as downstream of the injection manifold, to measure a parameter of the water to verify treatment product delivery of each component to the system. Each treatment product is fed into the manifold (or otherwise fed into the water system) separately, so that the sensor can make a measurement for each product being added. The controller receives a signal from the sensor regarding the measured parameter, which indicates whether treatment product was injected when it was supposed to be or whether sufficient (or too much) product was injected according to the pre-programmed functions. If the product was not injected or an incorrect amount of product was injected, the controller will alert a user that there is a malfunction or that a container of treatment product is empty and needs replacing.

According to another preferred embodiment, the treatment system controller tracks the amount of treatment product injected compared to the initial volume of product in the container and provides an alert when the remaining volume in the container is below a predetermined threshold, such as 10% or 5% volume remaining to indicate the container is near empty (or actually empty, if desired) so that it may be replaced. According to yet another preferred embodiment, the controller also tracks inventory of each type of treatment product used and can provide an alert or automatically send a replacement order to replenish inventory when the supply of any particular treatment product at the treatment location is low.

A preferred treatment control system and method according to the invention allows treatment feed rates of individual treatment products or components to be adjusted based on programmed functions. Those functions may be based on time, measurements from water system sensors, measurements from system water meters, or a combination thereof. This allows the treatment for a water system to be automatically adjusted in real time based on actual water chemistry and/or actual water system operating parameters, such as blowdown rate. The functions may also be manually changed on-site or via a remote connection to a preferred treatment control system to accommodate changes in treatment protocols or regulations or changes in desired concentrations of any particular treatment product. Preferably, a treatment control system has alarming functionality to indicate a problem with treatment delivery verification, low inventory, system malfunction, or other issues to provide a visual or audible alarm or to send a message to a remote user. A preferred treatment control system also records data regarding treatment feeds, calculations related to treatment feeds and programmed functions, programmed desired residual concentrations of treatment chemicals, and sensor readings or measurements and/or can send such data to a remote computer, terminal, or user. This data aids in demonstrating compliance with treatment protocols and regulations.

According to one preferred embodiment of the invention, an improved corrosion inhibitor, white rust inhibitor, and scale inhibitor treatment products comprise an amino-acid based polymer (AAP), hydroxyphosphonoacetic acid (HPA) or its water soluble salt, and another phosphonic acid or its water soluble salt, which may be added as separate treatment products using the delivery and control systems and methods of the invention. Hydroxyphosphonoacetic acid has the following general structure:

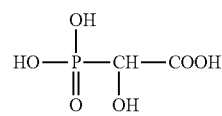

Most preferably, the amino-acid based polymer is polyaspartic acid or its water soluble salt, but other compounds such as polyglycine acid, polyglutamic acid and their salts may also be used. Most preferably, the amino acid based polymer has the following formula:

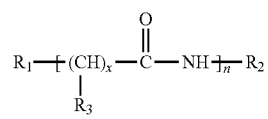

where R1=H, R2=OH, and R3=COOH and x=1 for polyaspartic acid. Most preferably, the other phosphonic acid is a phosphonocarboxylic acid or any organic phosphonate may also be used. Most preferably, the phosphonocarboxylic acid is 1-hydroxyethane-1,1-diphosphonic acid (HEDP) or 2-phosphonobutene-1,2,4-tricarboxylic acid (PBTC) or phosphonosuccinic acid. Preferably the weight ratio of AAP to HPA in the inhibitor treatment products is 90:10 to 10:90 and the ratio of combined AAP and HPA (which may be combined together, pre-mixed into a single container, but are more preferably maintained as separate ingredients) to other phosphonic acid is in the range of 90:10 to 60:40. More preferably, the weight ratio range of AAP to HPA in the inhibitor treatment products is 80:20 to 80:20 and the ratio of combined AAP and HPA to other phosphonic acid is 80:20 to 70:30.

Most preferably, all treatment products used in connection with the AAP/HPA/phosphonic acid treatment products according to a preferred embodiment of the invention are all organic and do not contain regulated metals such as zinc, chromate, and molybdate and their combined performance is not affected by addition of biocides. Most preferably, all treatment products used in connection with the AAP/HPA/phosphonic acid treatment products according to a preferred embodiment of the invention do not contain tin.

It was previously known to use both HPA and AAP, such as polyaspartic acid, separately as corrosion inhibitors. It was also disclosed in the '023 patent that AAP could be used together with phosphonocarboxylic acid to inhibit corrosion and scale, but it was not previously known to use AAP and HPA together along with another phosphonic acid, preferably a phosphonocarboxylic acid, or an organic phosphonate to inhibit corrosion or scale.

When added to the water in the water system being treated, preferred AAP/HPA/phosphonic acid treatment products according to the invention for inhibiting corrosion yield at least 3 ppm active AAP, at least 3 ppm active HPA, and at least 2 ppm of the other phosphonic acid. More preferably, when added to the water in the water system being treated, preferred AAP/HPA/phosphonic acid treatment products yield 3 ppm-50 ppm AAP, 3 ppm-50 ppm HPA, and 2 ppm-20 ppm of the other phosphonic acid and most preferably between 5 ppm-30 ppm AAP, 3 ppm-20 ppm HPA, and 2 ppm-10 ppm of the other phosphonic acid. Additionally, the combined total of the three components of preferred AAP/HPA/phosphonic acid treatment products yield at least 8 ppm active corrosion inhibitors when added to the water being treated. These ingredients have the unexpected synergistic effect of improved corrosion inhibition in low LSI water systems (LSI<-0.5) without requiring the use of toxic metals and without being adversely impacted by biocides.

In addition to unexpected and synergistic effect of the AAP/HPA/phosphonic acid inhibitor treatment products on ferrous metal corrosion inhibition in low LSI water, the same AAP/HPA/phosphonic acid treatment products also have a positive effect on preventing formation of white rust on galvanized steel. Galvanized steel consists of a thin coating of zinc fused to a steel substrate. White rust is a rapid, localized corrosion attack on zinc that usually appears as a voluminous white deposit. This rapid corrosion can completely remove zinc in a localized area with the resultant reduction in equipment life. White rust formation tends to increase with increased alkalinity levels in the water. Neither hydroxyphosphonoacetic acid nor amino-acid based polymers, such as polyaspartic acid, alone or in combination, has been previously utilized in commercial products for white rust prevention. Without being bound by theory, it is believed that the AAP/HPA/phosphonic acid treatment products according to the invention may be forming a protective layer on the surface of galvanized steel and reduce white rust formation. For treating white rust according to the invention, it is preferred to use hydroxyphosphonoacetic acid, an amino-acid based polymer, and another phosphonic acid in the amounts indicated above for inhibiting corrosion (both weight ratios and concentrations when added to the water in the water system being treated), but it has also been found that the use of an amino-acid based polymer without hydroxyphosphonoacetic or the other phosphonic acid is beneficial at inhibiting white rust. According to another preferred embodiment, treatment products for treating white rust comprise an amino-acid based polymer used together with hydroxyphosphonoacetic acid, and without another phosphonic acid. According to yet another preferred embodiment, treatment products for treating white rust comprise an amino-acid based polymer, without any hydroxyphosphonoacetic acid. The preferred concentrations and ranges for these treatment product components when added to the water being treated for white rust are the same as for inhibiting corrosion.

In addition to unexpected and synergistic effect of the inhibitor treatment products on white rust and on ferrous metal corrosion inhibition in low LSI water, the same AAP/HPA/phosphonic acid treatment products also have a positive effect on preventing formation of mineral scale in high LSI water (LSI>1). Mineral scale includes calcium and magnesium carbonate, calcium phosphate, calcium sulfate, and silica. Solubility of calcium carbonate and phosphate decreases when temperature increases, making calcium carbonate and calcium phosphate more of an issue in water systems with higher temperatures, such as cooling towers. LSI is determined by the following formula:

LSI=pH−pHs, where pHs is pH at CaCO3 saturation point.

An LSI>0 indicates scaling, as scale can form and CaCO3 precipitation may occur. An LSI≤0 indicates nonscaling, as there is no potential to scale and the water will dissolve CaCO3. As will be understood by those of ordinary skill in the art, LSI is an indication of driving force and not strict quantitative indication of scale formation, which will depend on the water characteristics, temperature, and water systems operations. However, without a scale inhibitor, scale will typically precipitate out of water when the LSI is greater than 0.2. Using treatment products according to preferred embodiments of the invention, no scale will form (calcium carbonate will not precipitate out of the water) at LSI values of 1-3.

When added to the water in the water system being treated, preferred AAP/HPA/phosphonic acid treatment products according to the invention for inhibiting scale yield at least 2 ppm active AAP, at least 2 ppm active HPA, and at least 1.5 ppm of the other phosphonic acid. More preferably, when added to the water in the water system being treated, preferred AAP/HPA/phosphonic acid treatment products yield 2 ppm-50 ppm AAP, 2 ppm-50 ppm HPA, and 1.5 ppm-20 ppm of the other phosphonic acid and most preferably between 3 ppm-30 ppm AAP, 2 ppm-20 ppm HPA, and 1.5 ppm-10 ppm of the other phosphonic acid. Additionally, the combined total of the three components of preferred AAP/HPA/phosphonic acid treatment products yield at least 6.5 ppm active scale inhibitors when added to the water being treated. These ingredients have the unexpected synergistic effect of improved corrosion inhibition in high LSI water systems (LSI>1) without requiring the use of toxic metals and without being adversely impacted by biocides.

Treatment products according to preferred embodiments of the invention work together to inhibit corrosion of metals such as ferrous metals, aluminum and its alloys, copper and its alloys, zinc and its alloys, galvanized steel (including white rust), lead, or solder, and to prevent mineral scale formation. The treatment products are particularly useful in water systems such as open recirculating systems, closed loop cooling or heating systems, and boilers that may experience corrosion, white rust, and scale formation during different times of the year or under different operating conditions, including use in both low LSI (high corrosively water) and high LSI (high scale tendency) waters.

According to other preferred embodiments, additional treatment products may be used with preferred AAP/HPA/ phosphonic acid treatment products for inhibiting corrosion or white rust or scale. These additional treatment products include one or more of the following ingredients: a neutralizing amine, chlorine stabilizer, such as monoethanol amine (MEA); a secondary scale inhibitor (since the treatment products themselves also work as a scale inhibitor) and dispersion agent, such as polycarboxylate polymer and/or carboxylate/sulfonate functional copolymers (typical examples: polyacrylic acid (PAA), polymethacrylic acid (PMAA), polymaleic acid (PMA), and copolymers of acrylic acid and 2-acylamido-methylpropane sulfonic acid (AA/AMPS); other scale and corrosion inhibitors, chelant agents; azole corrosion inhibitors, such as benzotriazole, alkylbenzotriazole (tolyltriazole); and/or a fluorescent dye tracer, such as 1,3,6,8-Pyrenetetrasulfonic acid tetrasodium salt (PTSA). Although it is preferred to use the AAP/HPA/ phosphonic acid treatment products as separate ingredients with the delivery and control system of the invention, these products may also be pre-mixed, optionally with one or more of the additional treatment products noted above, into a single pre-mixed composition. The overall pre-mixed composition preferably comprises around 2%-15% (by weight) of an amino-acid based polymer (such as polyaspartic acid), around 2% to 10% (by weight) of hydroxy-phosphonoacetic acid, and around 2% to 10% (by weight) of another phosphonic acid.

According to one preferred method of preventing corrosion of metal components, white rust on galvanized steel components, and/or scale in a water system, AAP/HPA/ phosphonic acid treatment products according to the preferred embodiments of invention as described above are added to the water system as separate ingredients using a delivery and control system according to a preferred embodiment of the invention. Depending on the type of issue being treated, one or more of the AAP/HPA/phosphonic acid treatment products are added to the water system (with combinations of two or more ingredients added at substantially the same time) to provide the above noted preferred concentration ranges. For preventing corrosion and white rust inhibition, a preferred delivery and control system operates to feed one or more of the AAP, HPA, and another phosphonic acid as described above, into the water at an effective feed rate of 20 ppm-600 ppm, or more preferably 100-300 ppm, of treatment products, depending on the treated water chemistry and the amount of optional treatment products used in connection with the AAP/HPA/ phosphonic acid treatment products. Preferably, a sufficient amount of treatment products are added to the water system to provide effective active amounts of one or more of the three treatment components (depending on whether white rust is being treated or both corrosion and white rust) of at least 3 ppm AAP, at least 3 ppm HPA, and at least 2 ppm of another phosphonic acid, each as initial concentrations when added to the volume of water in the water system being treated. More preferably, the treatment products are added in a sufficient amount to provide effective active amounts one or more of the components of between 3 ppm-50 ppm AAP, between 3 pm-50 ppm HPA, and between 2 pm-20 ppm of another phosphonic acid when added to the water in the water system. Most preferably, these effective active amounts are 5 ppm-30 ppm AAP, 3 ppm-20 ppm HPA, and 2 ppm-10 ppm other phosphonic acid when added to the water in the water system.

For scale inhibition, a preferred delivery and control system feeds one or more of the AAP, HPA, and another phosphonic acid as described above into the water at an effective feed rate of 20 ppm-600 ppm, or more preferably 50-300 ppm, of treatment products, depending on the treated water chemistry and the amount of optional treatment products used in connection with the AAP/HPA/phosphonic acid treatment products. Preferably, a sufficient amount of treatment products are added to the water system to provide effective active amounts of one or more of the three treatment components of at least 2 ppm AAP, at least 2 ppm HPA, and at least 1.5 ppm of another phosphonic acid, each as initial concentrations when added to the volume of water in the water system being treated. More preferably, the treatment products are added in a sufficient amount to provide effective active amounts of the three treatment components of 2 ppm-50 ppm AAP, 2 ppm-50 ppm HPA, and 1.5 ppm-20 ppm of another phosphonic acid, each as initial concentrations when added to the volume of water in the water system being treated. Most preferably, the treatment products are added in a sufficient amount to provide effective active amounts of the three components of between 3 ppm-30 ppm AAP, between 2 pm-20 ppm HPA, and between 1.5 ppm-10 ppm of another phosphonic acid when added to the water in the water system.

BRIEF DESCRIPTION OF THE DRAWINGS

The system and method of the invention are further described and explained in relation to the following drawings wherein:

FIG. 8 contains photographs showing corrosion levels on steel coupons after spinner tests at flow rates of 3 ft/sec and 5 ft/sec;

FIG. 9 contains photographs showing corrosion levels on steel coupons after spinner tests run in presence of biocide at flow rates of 3 ft/sec and 5 ft/sec;

FIG. 11 contains photographs showing white rust levels on galvanized coupons after spinner tests.

DESCRIPTION OF THE PREFERRED EMBODIMENTS

Figure 1:
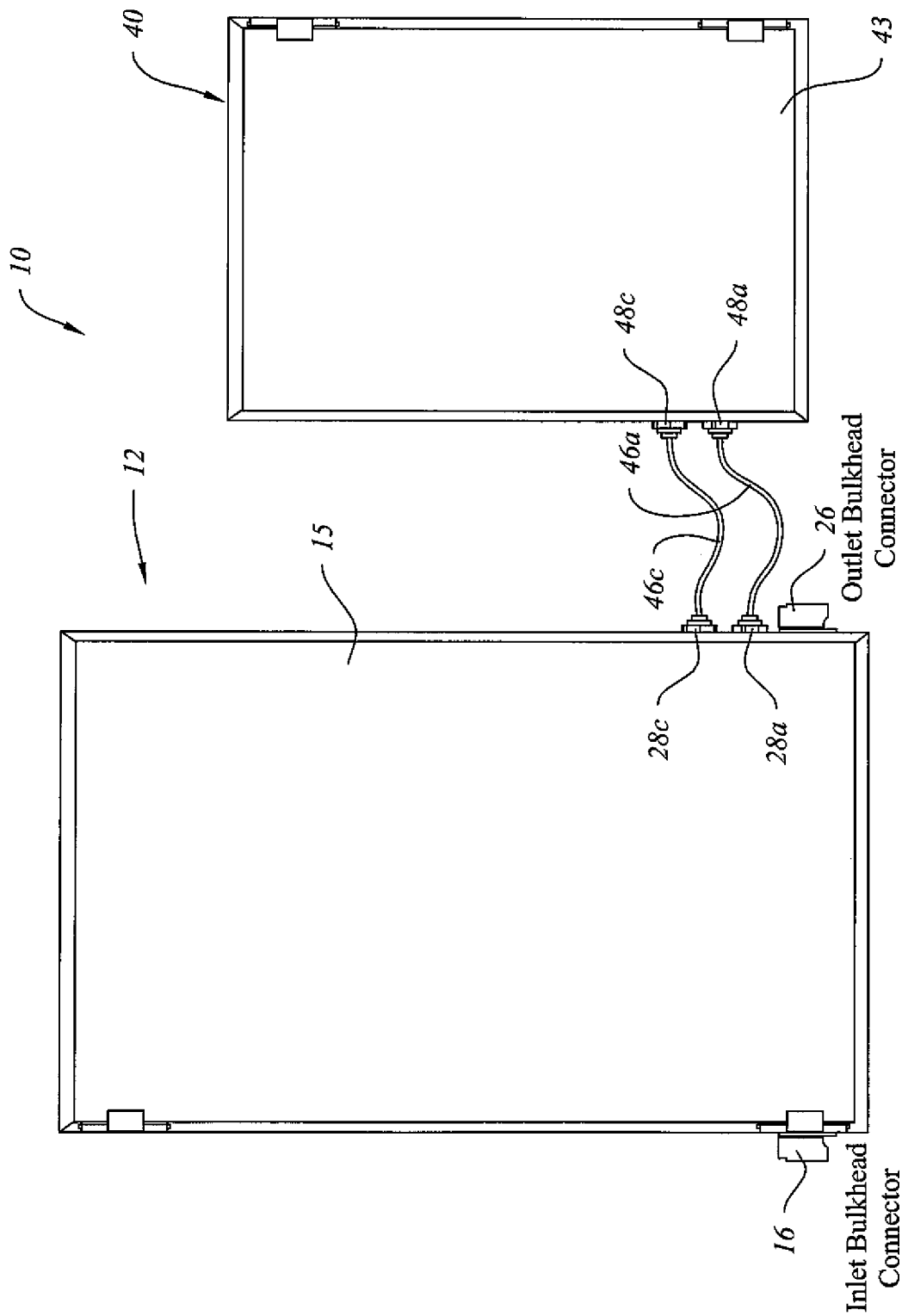
FIG. 1 is a front elevation view of one preferred embodiment of treatment control system according to the invention.
Figure 2:
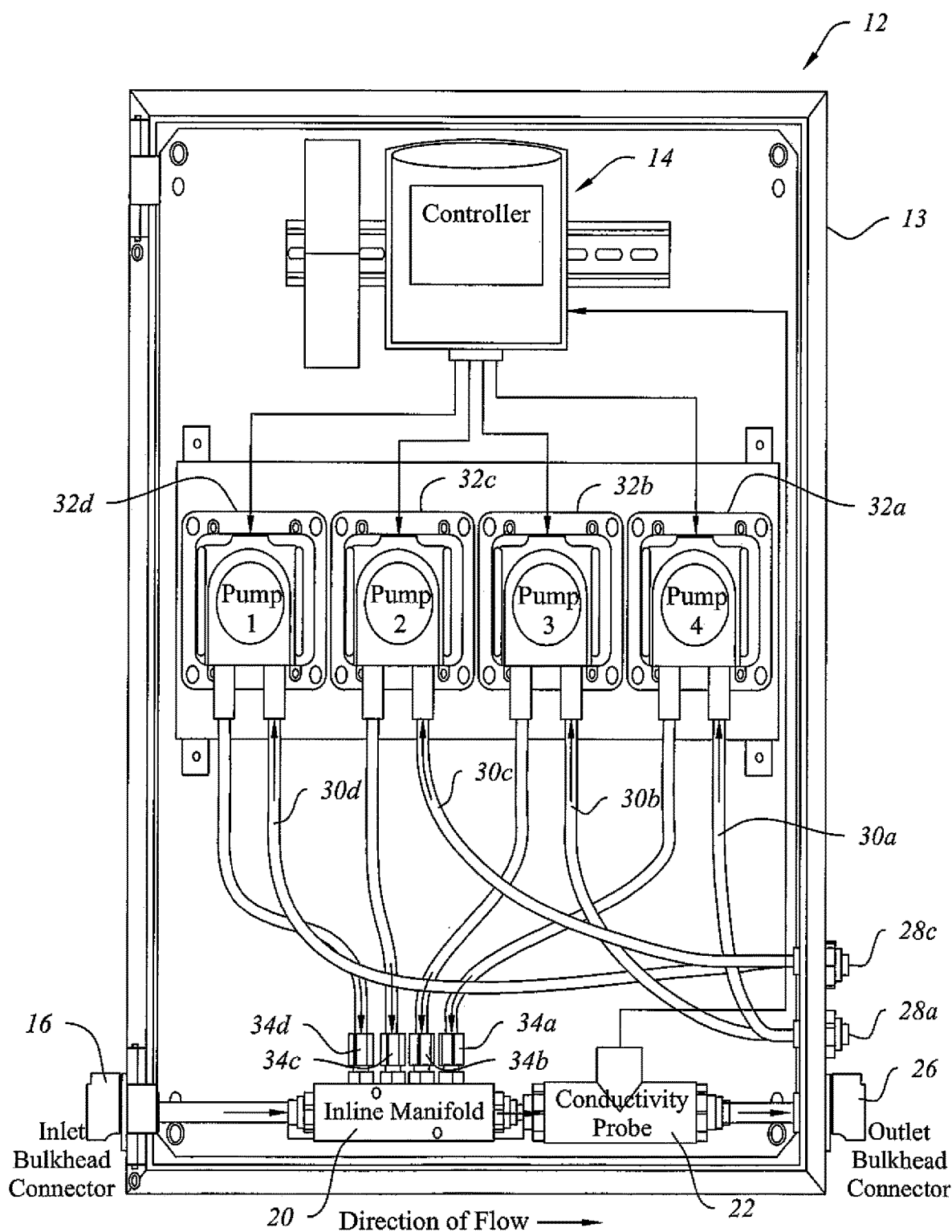
FIG. 2 is a front elevation view of one preferred embodiment of the internal components of a portion of the treatment control system according to FIG. 1.
Figure 3:
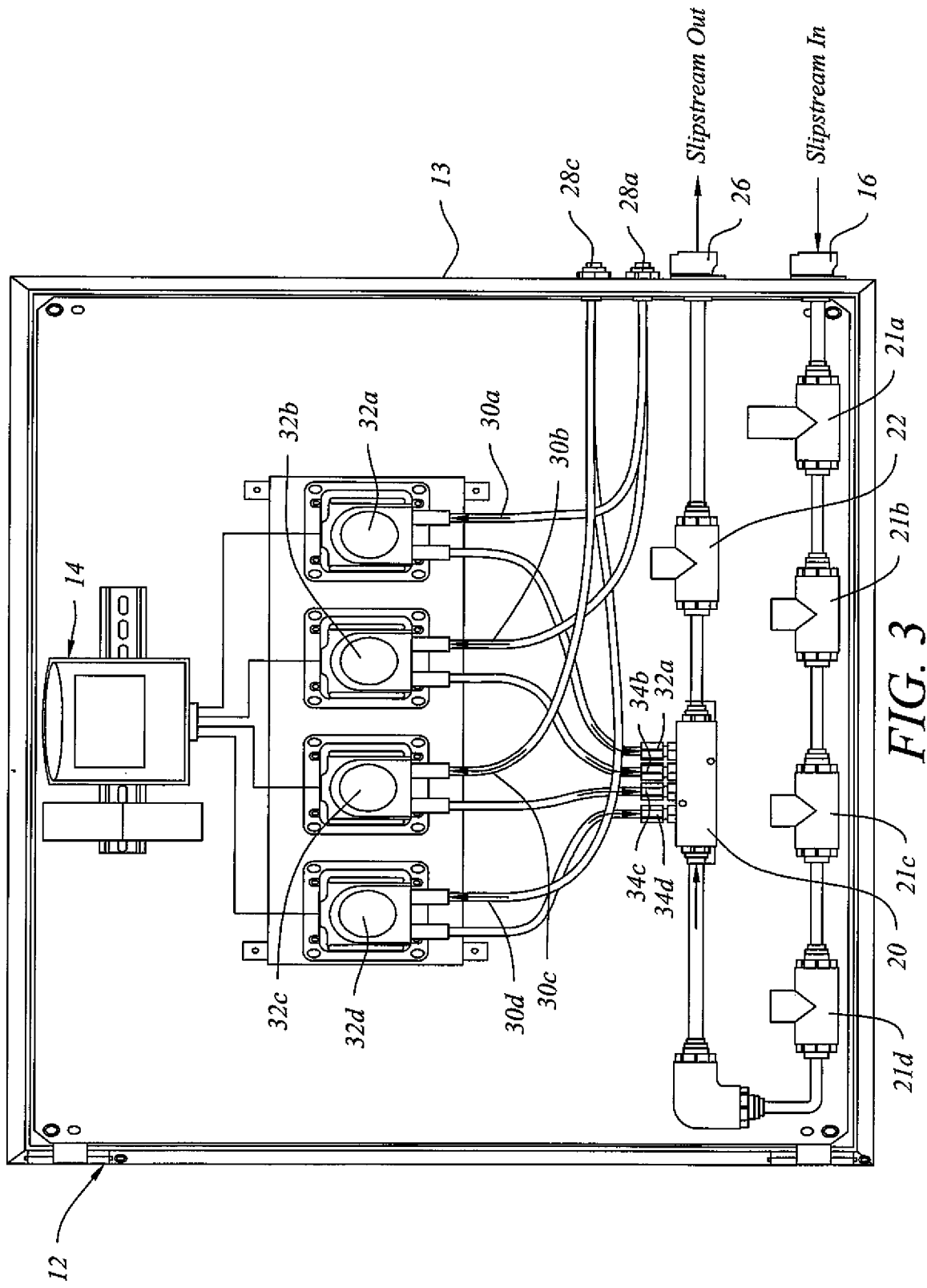
FIG. 3 is a front elevation view of an alternate preferred embodiment of the internal components of FIG. 2.

Referring to FIG. 1, one preferred embodiment of a treatment delivery and control system 10 is shown. System 10 preferably comprises control housing 12 and treatment housing 40. Each housing 12 and 40 preferably has a box like body 13, 41 and a closable or removable door or cover 15, 43 that protects the interior components in the housing but also allows access for service and for replacement of treatment product containers 42. Most preferably, each housing 12 and 40 is a NEMA 4 equivalent box.

Referring to FIGS. 1-4, system 10 also preferably comprises a controller 14 that controls a feeder 32 for each container 42 of treatment product, to initiate feed of each treatment product into the water system at a preprogrammed time or in response to one or more measurements of the water, to feed an amount of treatment product over a period of time or at periodic intervals in accordance with programmed feed rate functions based on desired concentrations of treatment products, sensor readings or measurements, and/or preset feeder activation times. Feed rates for each treatment product may be calculated by controller 14 based on duration of time a valve is opened, duration of time a feeder pump is on, calculated flow rates based on pump capacity or tubing size, measured based on readings from a flow meter, or any other combination of parameters and measurements for the various components of system 10 as will be understood by those of ordinary skill in the art. Preferably controller 14 is a programmable logic controller ("PLC") or industrial computer 14. Treatment system 10 also preferably comprises one or more feeders 32 (preferably pumps), a manifold 20, and a conductivity meter 22 (or other sensor) downstream of the manifold, one or more sensors 21 upstream of the manifold, all inside housing 12. System 10 also preferably comprises one or more treatment containers 42 inside housing 40. Disposed through a wall of housing body 13 are connection ports 16 and 26, which allows system 10 to be connected to a side or slip stream drawn off of the water system and to return that water with injected treatment products back into the water system using tubing or piping, as will be understood by those of ordinary skill in the art. Also disposed through housing body 13 and body 41 are connection ports 28 and 48, connected together by tubing 46, to allow treatment products to flow from containers 42 within housing 40 to the injection manifold 20 via pump 32. Connection ports 16, 26, 28, and 48 are preferably quick connecting type ports. Preferably, there is one connection port 28, 48 for each container 42 (e.g. 28a, 28b, etc.). Alternatively, housing body 41 may have an aperture(s) to allow tubing 44 connected to a treatment container 42 to pass through to connection port 28, without using a separate connection port 48 or separate tubing 46.

A feeder is used to feed treatment product into the water system. Preferably there is one feeder for each container of treatment product. A preferred feeder for system 10 is a pump 32, preferably a metering peristaltic pump, but other types of pumps may also be used. Peristaltic pumps are preferred because they provide consistent metered feed with no loss of prime, which has been a problem with prior art treatment feeds and a major cause of prior art treatment failures. A pump 32 is preferably provided for each treatment container 42 to pump the treatment from the container 42 to a port 34 on manifold 20. For example, pump 32a pumps treatment product from container 42a through tubing 44a, through port 48a and tubing 46a (if port 48a is used), through port 28a, and through tubing 30a to port 34a on manifold 20. Ports 28 for containers 42b and 42d are not shown in FIG. 2 because they are located rearwardly of ports 28a and 28c. A slip stream or side stream from the water system passes through port 16, through tubing 18 into manifold 20, where one or more treatment products from containers 42 are injected through ports 34. Treatment control system 10 may be plumbed to an existing water system pressurized line to feed a slip stream or side stream to system 10 through port 16, or a submersible pump may be placed in a sump to pump water from the water system to system 10 through port 16. The treated water exits manifold 20 and passes through a sensor 22, preferably a conductivity meter, then through tubing 24 and out through exit port 26. Tubing or piping connected to port 26 then reintroduces the treated water back into the water system. One or more sensors 21 (such as 21a, 21b, etc.) may also be placed upstream of manifold 20 to detect properties of the water prior to injection of the treatment product (although the water passing through sensor 21 may have one or more treatment products in it from previous injections of treatment product). Sensor(s) 21 may include an inline fluorimeter, a pH meter, another conductivity meter (other than conductivity meter 22), a flow meter, a flow switch, temperature sensor, and/or an ORP sensor or similar sensor to monitor oxidant level.

Although pumps 32 are preferred feeders for treatment product into the water system, other feeders or feed systems may also be used with treatment control system 10. For example, containers 42 may be located to feed into water system via gravity feed, such as feeding directly to the water system sump, or a venturi injector with PLC 14 controlling valves to block or allow treatment flow in order to control the feed rate of the treatment products.

Figure 4:
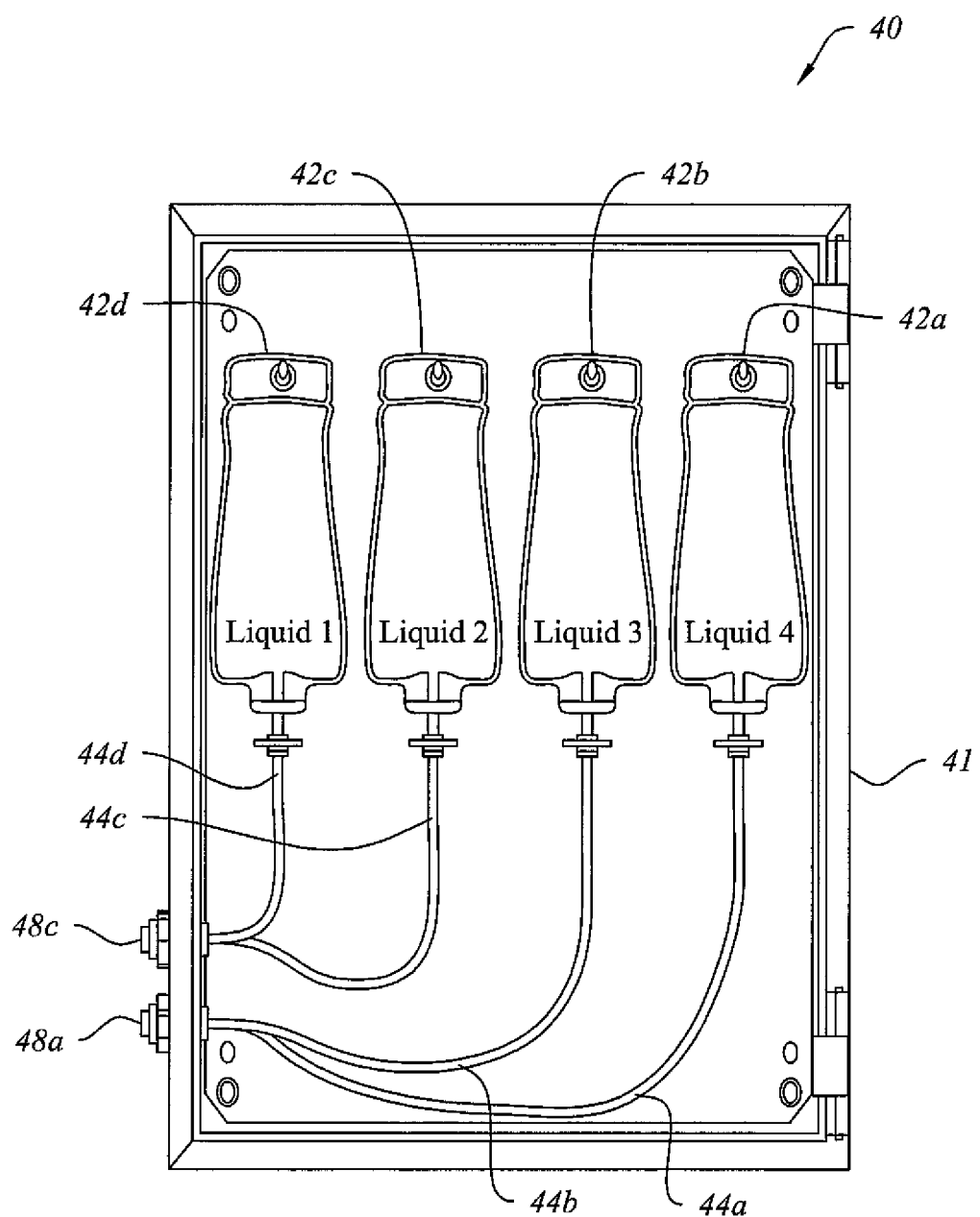
FIG. 4 is a front elevation view of one preferred embodiment of the internal components of another portion of the treatment control system according to FIG. 1.
Figure 5:
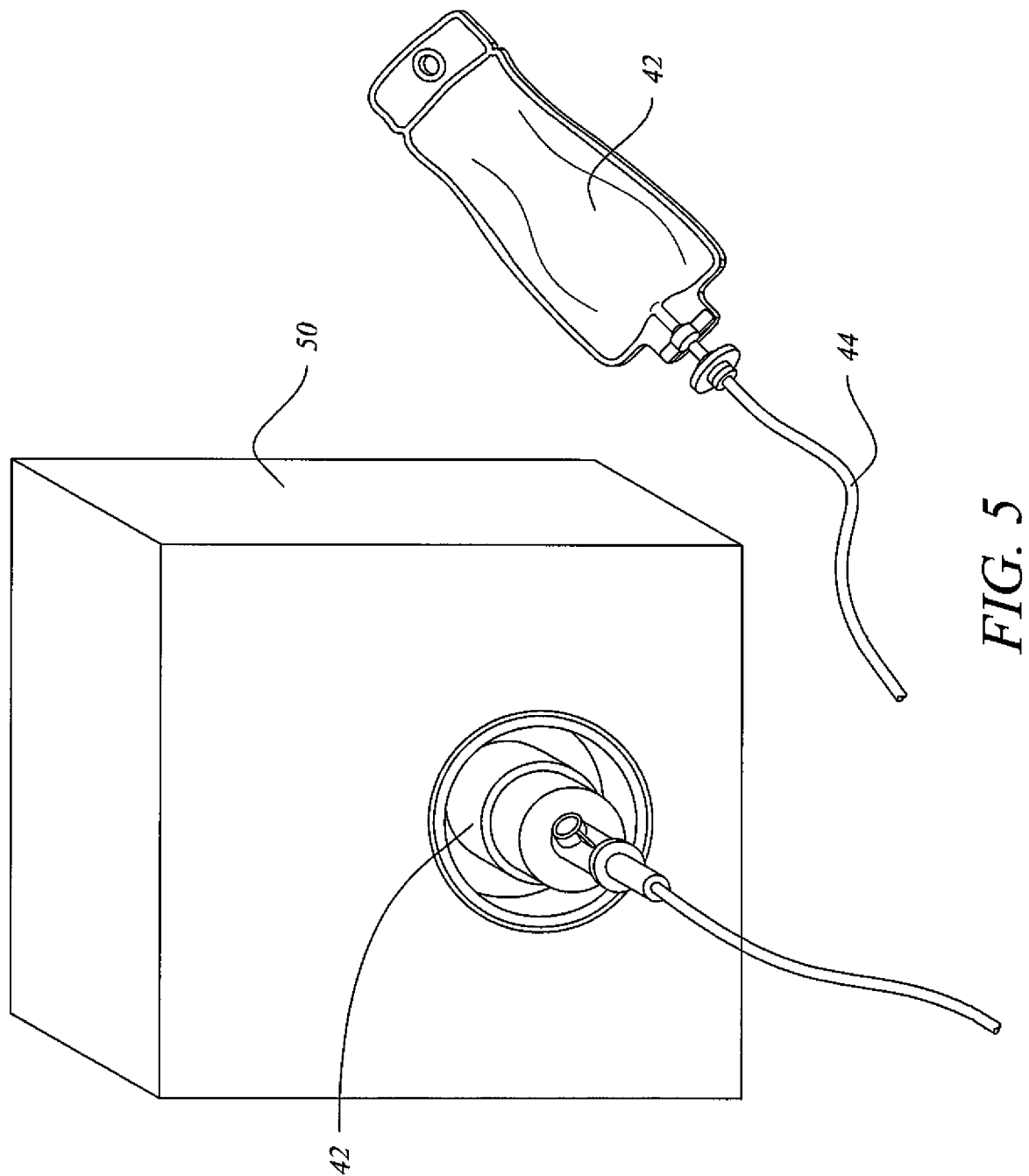
FIG. 5 is a perspective view of a preferred treatment storage and feed container for use with a treatment control system according to the invention.

Referring to FIGS. 4 and 5, each treatment container 42 preferably comprises a flexible pouch with integrated tubing 44, similar to an IV bag, having an end fitting to allow connection to port 48 or port 28. Container 42 is preferably hung inside housing 40 via hooks or clips attached to an interior wall of housing 40. Optionally, a flexible pouch container 42 may be placed within another container, such as a box 50 or a "Cubitainer," to provide further protection for container 42 and support for container 42 within housing 40. As an alternative, housing 40 may be omitted from system 10 and containers 42 may be hung or set in a location adjacent housing 12, particularly if a protective and supportive box 50 is used. Other types of containers 42, such as a cylindrical vessel, may also be used. For any stiff sided container, the container may rest on a bottom wall of housing body 41, rather than being hung, and connection port 48 (or aperture) may be disposed through a bottom wall of housing 40. Other configurations may also be used.

Figure 6:
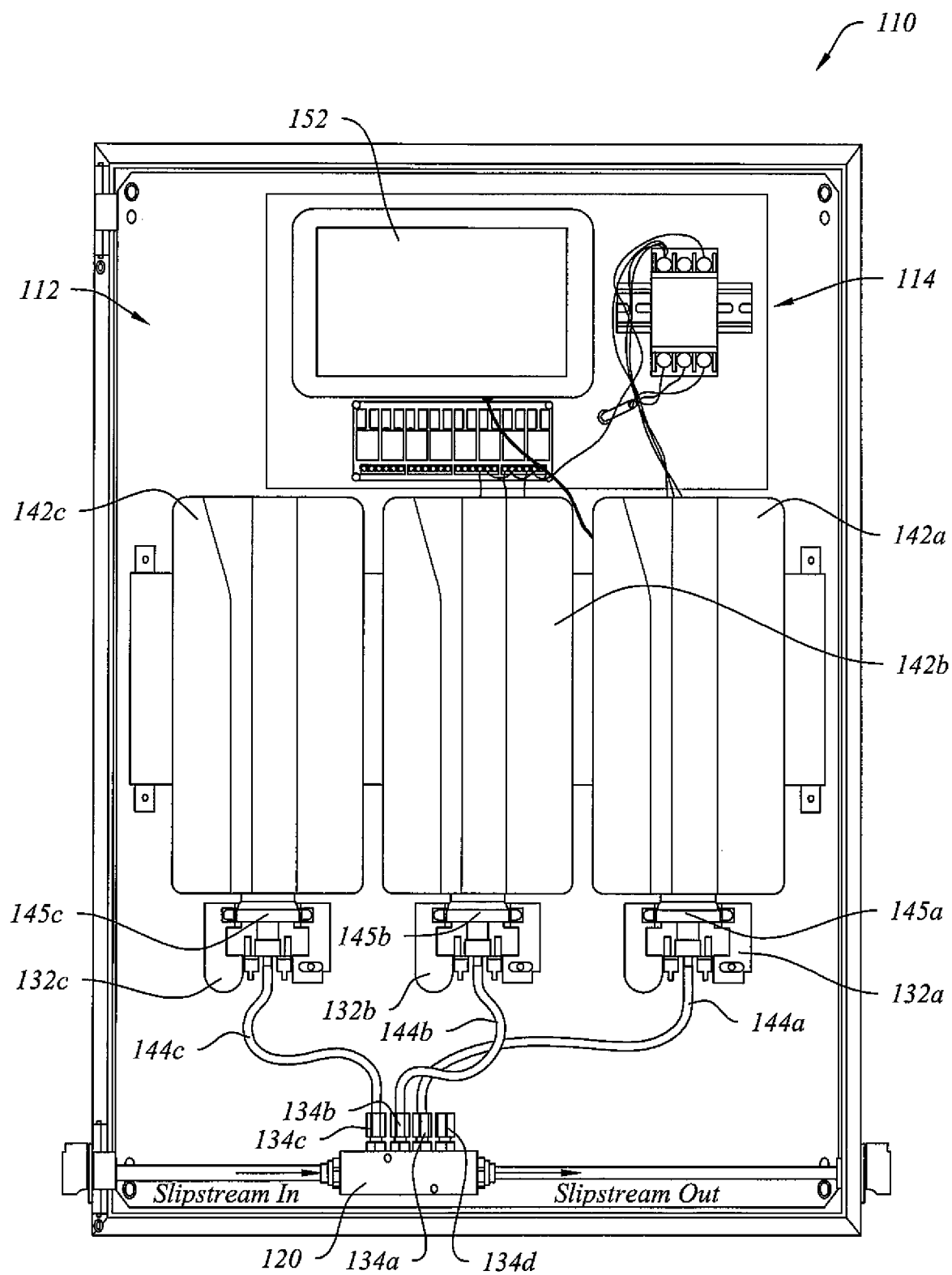
FIG. 6 is a front elevation view of another preferred embodiment of treatment control system according to the invention.

Referring to FIG. 6, another preferred embodiment of a treatment delivery and control system 110 is shown. System 110 preferably comprises a housing 112, which preferably has a box like body and a closable or removable door or cover that protects the interior components in the housing but also allows access for service and for replacement of treatment product containers 142 and feeder mechanism or pump mechanism 132. Most preferably, housing 12 is a NEMA 4 equivalent box. System 110 preferably comprises a plurality of containers 142, each comprising a cap 145 having a one-way valve and an exit tube, connectable in fluid communication with tubing 144 to dispense fluid from container 142 to manifold 120 and into the water system being treated. Each container 142 and cap 145 is preferably made of inexpensive plastic, that is easily replaceable when a container is empty or when the valve mechanism in cap 145 needs to be replaced. Containers 142 may come in different sizes depending on the size of the water system being treated and/or the treatment product contained in a particular container. A feeder or pump mechanism 132 is preferably provided for each container 142. Pump mechanism 132 may comprise a simple actuator to open and close a one-way valve in cap 145 to allow fluid to pass via gravity feed from container 142 through tubing 144. Alternatively pump mechanism 132 may comprise a motor configured to rotate an impeller to pump or move fluid from container 142 through tubing 144 and port 134 to deliver a treatment product to the water system without relying on gravity feed. As another alternative, pump mechanism 132 may comprise a motor configured to rotate a wheel with a crank pin that engages with a slide plate to actuate a piston in cap 145 to pump fluid from container 142. Other pumping mechanisms may also be used, as will be understood by those of ordinary skill in the art. Each pump mechanism 132 may be battery powered or powered through controller 114. Pump mechanism 132 is preferably inexpensive and easily replaced when needed. Although container 142 may be a flexible pouch, like preferred containers 42, more preferably they are stiff-sided or rigid plastic containers capable of standing on any stable, flat surface. Each pump mechanism is preferably attached to a rear wall of housing 112 or may sit on a bottom side of housing 112 and each preferably has a flange on which container 142 or a portion of cap 145 may be supported in an inverted position (cap 145 facing down). Other configurations may also be used.

Treatment system 110 also preferably comprises a manifold 120 and a plurality of ports 134, each connected to a tubing 144. A slipstream from the water system being treated is diverted to system 110, passes through manifold 120 where treatment product(s) are added according to programmed functions, and the slipstream with the added treatment product(s) is returned to the water system. Although two separate housings may be used (as with system 10), preferably only a single housing 112 is used with system 110. Ports (not shown) may be included through walls of the housing 112 to allow connection of the slipstream to manifold 120, as previously described with system 10. System 110 may also include one or more sensors, such as a conductivity meter, upstream or downstream of the manifold (similar to sensors 21, 22 in system 10). Preferably, such sensors are contained inside housing 112.

System 110 also preferably comprises a controller 114 that controls a feeder mechanism or pump mechanism 132 for each container 142 of treatment product, to initiate feed of each treatment product into the water system at a preprogrammed time or in response to one or more measurements of the water, to feed an amount of treatment product over a period of time or at periodic intervals in accordance with programmed feed rate functions based on desired concentrations of treatment products, sensor readings or measurements, and/or preset feeder activation times. Feed rates for each treatment product may be calculated by controller 114 based on duration of time a valve in cap 145 is opened/duration of time a feeder pump 132 is onto actuate the valve in cap 145, calculated flow rates based on pump capacity or tubing size, measured based on readings from a flow meter, or any other combination of parameters and measurements for the various components of system 110 as will be understood by those of ordinary skill in the art. Preferably controller 114 is a small single board computer with wireless and blue tooth capabilities, HDMI or other data connection ports, and optionally one or more DC drive units to power pump mechanisms 132. Controller 114 may be preprogrammed with a variety of programs to operate pump mechanisms 132 to dispense various amounts of each treatment product at specified time intervals. An optional, but preferable, display screen 152 may be used for communication of data and manual data entry, as needed.

Most preferably, each treatment container 42a, 42b, 42c, 42d, 142a, 142b, 142c, etc. contains a different treatment product in concentrated form, such as the AAP in container 42a or 142a, the HPA in container 42b or 142b, and the other phosphonic acid in container 42c or 142c. Other optional ingredients may be in different containers 42 or 142. Additionally, other treatment products, such as other scale inhibitors, corrosion inhibitors, biocides (preferably one oxidizing and one non-oxidizing), etc. may be contained in other containers 42 or 142. Most preferably, each container 42 contains an individual treatment chemical or ingredient (each with a single active ingredient, although combinations or two or more active ingredients may also be used), which allows the use of 8-12 common chemical components for treatment of a typical water system instead of 50-100 formulated, pre-mixed treatment compositions to achieve the same results. This allows the use of twelve or fewer containers 42, 142 for treatment system 10, 110 to cover most typical water system treatment issues. Most commercial formulated multi-component treatments can be reduced to around 4 core components, allowing the use of only four containers 42, 142 with treatment system 10, 110 for most water systems. Although any particular treatment container 42, 142 may contain a pre-mixed treatment composition having multiple chemicals or active components (such as a corrosion inhibitor and a biocide) to treat one or more water system issues, it is preferred that each container 42, 142 have only one or two active components or ingredient to target a single water system issue, either alone or in combination with another component or ingredient in another container. The treatments in the various containers 42a, 42b, 142a, 142b, etc. may be compatible for use together or may be incompatible, since system 10, 110 is capable of controlling when each treatment is dosed to the water system, as discussed below, the timing may be controlled to avoid any adverse interactions between treatment products. Most preferably, the treatment products are concentrated liquid products, so that each container 42, 142 is small, lightweight, and easy to ship, store, and change out. Although other sizes may be used, each container 42, 142 preferably holds around 5 L of treatment product. The use of four containers 42a-42d (or 142a-142d) each containing a core treatment chemical (such as AAP, HPA, other phosphonic acid, and a biocide), at 5 L each will treat a 100 ton cooling system for an average of 3 months. Larger sized containers, up to 25 L pouches or even larger drums, may also be used to treat larger sized water systems. More than four containers 42, 142 may also be used, depending on the number of treatment products that are needed to treat the issue of a given water system.

Systems 10, 110 also allows for easy change-out of the treatment products being used by simply disconnecting the tubing for one treatment container, removing the treatment container and replacing it with another having the same or a different product. This allows flexibility in systems 10, 110 to accommodate larger scale changes in the treatment requirements of the water system, which require different treatment products. The use of preferred flexible pouches for containers 42, or bottles 142, facilitate inventory control and ease of handling and reduce waste of the larger bucket or drum previously used with diluted treatment products; however, larger container sizes may be used for larger systems, including drums if necessary, to meet demands of the water system being treated. Each pouch-type container 42 preferably has a fitment designed to simplify connection to the pump feeder through ports 28 and minimize user contact with the treatment products. Similarly, each container 142 allows for easy connection of tubing 144 to an outlet fitting on cap 145 and placement within pump mechanism 132 to minimize or even eliminate user contact with the treatment products. Since feed rate of each treatment product is based on feeder or pump 32, 132 activation time, most preferably each container 42, 142 has coloration or a label that coordinates with coloration or a label on a component to which the container is to be connected, such as tubing 44a, 44b, 144a, 144b, pump tubing 30a, 30b, etc., tubing 46a, 46b, etc. (if used), port 34a, 34b, 134a, 134b, etc. to ensure that treatment products in containers 42a, 42b, 142a, 142b, etc. are aligned with the proper pump 32a, 32b, etc. or port or tubing so that each treatment product has the proper feed rate according to the pre-programmed functions. Preferably, the color or label used with each set of components (e.g. pump tubing 30a) is different from each other set of components (e.g. pump tubing 30b, 30c). Other visual indicators, such as patterns, shapes, numbers, or writing, may also be used on these components or any combination thereof to aid in aligning a pump or other feeder with the container and manifold port to which it should be connected.

Most preferably, treatment products as one or two treatment components or ingredients (single or mixtures of active ingredients with no dilution) would be packaged in neutralized form, to allow for transport of non-hazardous materials and safer handling. Because the components are individually packaged, dilution with water and high pHs would not be required to maintain solution solubility, as may be required with pre-mixed compositions. The reduction in water, caustic, and other binder also reduces shipping weight by 50% or more, significantly reducing shipping costs. This is particularly useful with certain types of treatment products. For example, polymers and phosphonates are stable at neutral pH's (2.5 to 11) in high concentrations (35 to 60% solids). Triazoles can be sourced in glycol solutions at 25 to 50% solutions (propylene glycol, for example, is non-hazardous and safe for use in food plants). Phosphonates and triazoles are easily tested in the system to determine the level of treatment within the water system. Polymer might be mixed with tracers such as pyrene tetrasulfonic acid (PTSA) for on-line testing using a fluorimeter. All other components might be fed in ratio to the polymer (as an example) to achieve the desired treatment residuals. Components, such as sulfites are typical fed to boiler systems to maintain a prescribed residual based on system needs. Neutralization to a DOT non-hazardous weight might increase the weight slightly. But most current formulas have enough sodium hydroxide added to raise the pH levels to over 12. Since triazole is added separately, the extreme pH will not be required to keep solutions homogeneous. The triazole may be sourced as a propylene glycol solution. Additionally, a more effective triazole may be used which isn't as easily formulated with other components (such as butyl benzyl triazole, or chlorotriazole solutions). Although minimal dilution of the treatment products is preferred, they may be diluted with water or another suitable diluent if desired.

Most commercially available formulated, pre-mixed water treatment compositions are diluted to contain approximately 70% water, typically requiring shipment in large drum containers. By shipping individual components in containers 42 in concentrated form, shipping weights are reduced to 25 to 50% as shown below:

Example 1: Cooling Water Treatment 1 (Chem-Aqua 31155)

Package size: 47.9 pounds; 5-gallons
Contains: Triazole, 2 polymers, phosphonate, and a tracer.
Individual component weights: 14.2 pounds (29.6% of formula weight).

Example 2: Cooling Water Treatment 2 (Chem-Aqua 8500 MPT)

Package size: 50.4 #, 5-gallons
Contains: Triazole, polymer, phosphonate, Zinc as Zinc Sulfate, and a tracer
Individual component weights: 14.6 pounds (29% of formula weight).

PLC 14 or controller 114 is connected to each pump 32, 132 and preferably to an optional conductivity meter (or other sensor) 22, and to optional sensor(s) 21. PLC 14 or controller 114 is also preferably connected to a separate control system for the water system, which is typically pre-existing and is used to control valves and other components of the water system, such as activating blowdown or altering make-up water addition. This allows interaction between the treatment control system 10, 110 and the water system controller, to further enhance the overall control of the water system. PLC 14 or controller 114 may optionally be connected to other water system sensors (already existing in the water system and not sensors 21, 22 of system 10, 110) and such a connection is preferred if system 10, 110 does not include that particular type of sensor as a sensor 21 upstream of manifold 20, 120. Water system sensors may include inline fluorimeter, a pH meter, another conductivity meter (other than conductivity meter 22), water system flow meters (such as a bleed-off flow meter or a make-up water flow meter), and/or an ORP sensor or similar sensor to monitor oxidant level, to receive signals from these sensors or meters to indicate when certain treatment action should be taken according to pre-programmed functions. For example, corrosion or scaling sensors may be used to adjust levels of chemical residuals to reduce corrosion or scale incidents. Alternatively, the water system controller may be (and likely already is) connected to those other sensors and meters and signals or measurements from those sensors may be sent to PLC 14 or controller 114 from the water system controller. PLC 14 or controller 114 also preferably has other telemetry capability (if not provided through connection to the water system controller), to send signals to remote users via text, email, or to a remote computer monitoring station, to allow a user to review current treatment system status, and verify treatment levels and chemical inventory remotely. It also preferably allows a remote user to make changes to the treatment program, alter calculation functions, modify various calculation inputs, such as desired residual concentration levels for individual treatment products, and change timer durations to alter pumping time to meet changing requirements of water chemistry, system needs, or the needs of the customer account. PLC 14 or controller 114 may also be connected to an optional visible or audible alarm to alert users of an issue with treatment system 10, 110. PLC 14 or controller 114 is also preferably capable of recording treatment system data, such as pumping time, conductivity readings, pH readings, etc., and/or sending such data to a remote computer or the water system controller for recording. This helps to demonstrate compliance with treatment protocols or regulations established by trade organizations (such as Association of Water Technologies, or Cooling Tower Institute) and state or federal agencies for proper corrosion, scale, and microbial control (including *legionella* protocols).

PLC 14 or controller 114 activates each pump 32a, 32b, 32c, 32d, etc. or pump mechanism 132a, 132b, 132c, 132d, etc. when it is time to inject the treatment product corresponding to that pump and maintains the pump in an active state until a sufficient amount of that treatment product has been injected into the water system based on pre-programmed functions and/or pre-programmed feed rates, which will vary based on pumping rate and water system needs. Activation of one or more pumps 32, 132 may be based on (1) a pre-programmed timer function (to start and shut off each pump at predetermined time intervals to achieve the desired injection rate of treatment product); (2) a measurement from one or more water system sensors or sensors 21 (for example, if a pH measurement or fluorimeter measurement is above or below a predetermined threshold or outside of a predetermined range of values, then the feed rate of one or more treatment products (e.g. from container 42a or 142a) may be increased or decreased according to pre-programmed calculation or comparison functions); (3) make-up water feed rate; (4) bleed-off or blow-down rate; or (5) any combination thereof. Preferably, there is a combination of pump rate/activation triggers used in system 10. For example, a pump 32a or 132a may be activated or deactivated for a pre-set period of time based on a fluorimeter reading indicating a decrease in treatment level concentrations, a water meter reading indicating displacement of treated water with untreated or fresh water such that additional treatment needs to be added to the water system, or calculated system bleed rates.

Most preferably, pumps 32, 132 are controlled by a combination timer functions, water system sensor measurements, measurements from sensor(s) 21, and/or water meter measurements or a combination of measurements from multiple water system sensors/flow meters and/or sensor(s) 21. For example, a pump 32a/132a may be set to pump treatment product from container 42a/142a on a timed basis, by activating the pump for one minute every hour. Pump 32a/132a may also be activated by PLC 14/controller 114 if a fluorimeter 21a (or a fluorimeter in the water system) sends a signal indicating a fluorimetric measurement is below a pre-determined threshold value or outside of a predetermined range of values, in which case pump 32a/132a is activated again. Calculated time intervals for subsequent pumps (32 b-d/132b-c) may be based on the actual feed time of a first treatment component needed to achieve a desired concentration level in the water system for that component based on the fluorimeter reading and calculating ratio-based feed times for other components based on the desired concentrations of those components according to pre-programmed functions (see the example calculation below). The programming of PLC 14 or controller 114 may also preferably be modified remotely, to adjust various inputs such as high or low threshold values or ranges or desired concentration levels in feed rate functions, adjust time intervals, and/or adjust calculated deviation and time values.

System 10, 110 allows the ratio of treatment components to be easily adjusted, by activating and deactivating pumps 32a-32d or altering pump rate, if the treatment requirements of the water system change, such as if the makeup water chemistry changes. PLC 14 or controller 114 preferably is capable of calculating treatment product feed rates for one treatment product based on a water system sensor or sensor 21 reading for another treatment product component (a primary chemical). For example, a primary chemical could be controlled by fluorimetric or other means and the feed amounts for other treatment chemicals can be based off of that fluorimetric reading using ratios to calculate feed rates based on desired residual concentrations in the water system for each treatment chemical. A variety of functions (calculation formulas, desired concentration levels, and sensor reading or measurement parameters) for various water system scenarios/issues may be pre-programmed into PLC 14 or controller 114 to determine and implement real time treatment product feeds needed to achieve desired treatment levels. The following are example calculations that may be used as part of the programmed functions for PLC 14/controller 114 to control pumps 32a-32d/132a-132c based on a timed function, a sensor measurement function, or a flow meter function to achieve the desired concentration of a particular treatment product within the water system.

Timed feed assumes a constant depletion of chemical and feeds at pre-set time intervals to maintain chemical level. Timed feed is the least accurate control system, particularly since water system demands frequently change which increases or decreases the rate of treatment chemical consumption/depletion, but is still useful in controlling treatment product feed. For a 100 ton cooling system, at 85% efficiency, there are 1836-gallons of bleed per day. To maintain chemical feed of a 100-ppm dose treatment, 1.53 lbs/day of treatment must be added to the water system. To maintain 2.9-ppm of a polymer fed from a 50% solution would require 0.056 lbs/day (or 31.24-ml/day) fed incrementally throughout the day. To achieve this feed rate using a 1.3 ml/minute pump rate, would require pump 32a be on (activated) for 1.0012 minutes/hour (the "on-time"). For simplicity, calculation of the other times for various components of a multi-component treatment (such as Chem-Aqua 31155) would be based on the on-time for this chemical, ratioed to the desired component concentration and the components concentration. For component concentrations of Chem-Aqua 31155, this would require an accumulated run time of 5.31 minutes per hour assuming the components are fed sequentially.

As described earlier, the feed program could be determined using a shipped, laboratory tested set of one or more water samples, and the results from these tests could be used to prescribe a feed program that would be communicated either through standard communication and input into the controller or through direct modification using remote communication.

Water meter based feed monitors either the volume of the water entering or leaving the system and feeds to treat the water volume bled or displaced ($V_B$). If the meter is a on the makeup water ($V_{MW}$) line, the feed is based on the volume divided by the number of cycles ($V_B = V_{MW}/(Cycles)$). If the meter is on the bleed line then feed is based on the meter reading. This type of control assumes no water leaves or enters by other routes; but it does (by cooling tower drift and system leaks) so feed rates are adjusted as the product level slips. Then chemical feed would be initiated after a number of water meter pulses. If a water meter on a makeup water line pulsed every 10-gallons and for a system maintained at 4 cycles, and the pump timers are set for every 10 pulses representing 100-gallons of makeup water, the 25-gallons of water was bled (100/4). Chemical feed would be timed to add treatment for 100 gallons (378 liters) of makeup. For a 50% polymer solution (Specific gravity @ 1.25) fed to maintain 2.9-ppm active, using a 1.3-ml/minutes pump 32 (as an example), 378-L×2.9-mg/L/1.25 g/ml/1000-mg/g/1.3 ml/min/4 cycles results in an on-time of 0.169-min (10.13 seconds). For simplicity the other component could be ratioed off the primary chemical. Or each component run time could be calculated for run times based on the set number of water meter pulses. If the water meter is on the bleed line, then for calculated cycles=1. Assuming that the other components are ratioed off the primary component, the component level in the system can be traced. If this component is 10% low, then the time fed/feed sequence can be increased 10%. Alternately if one of the other components is low and the primary component is adequate, the proportion of time it runs can be adjusted. These functions are pre-programmed into PLC 14 to allow it to automatically calculate and initiate treatment feeds based on meter readings.

For fluorimeter based feed, a primary component could be fed until the fluorimeter reading indicates the primary component has reached its target concentration. The time required to meet the desired level is noted and used to calculate the feed times for other treatment components, such as a triazole, based on a ratio calculation. For example, if the primary component (polymer) was fed 0.20 minutes to reach the desired fluorimeter level equivalent of a 2.9-ppm polymer residual concentration in the water system, then the feed time to achieve a residual concentration of a triazole of 4 ppm using a 40% active liquid triazole product with a specific gravity of ~1.2 is calculated as follows:

$$\frac{4\text{-ppm } TT}{40\% \ TT \ Sol} \times \frac{50\% \ \text{Polymer}}{2.9 \ \text{ppm Polymer}} \times \frac{1.25 \ Sp. \ G \ \text{polymer}}{1.20 \ Sp. \ G \ \text{Triazole}} = 1.80$$

Triazole feed time=0.2[polymer feed time]× 1.80=0.36 minutes.

Based on this example, if the primary component fed for 0.2 minutes, the Triazole component would feed 0.36 minutes. Other treatment components could be calculated the same way and these functions programed into PLC 14 or controller 114 to allow treatment feed times to be automatically calculated and initiated. The process is periodically repeated at pre-determined time intervals or at pre-determined triggers (such as a reading of another sensor 21 or a water system sensor or meter) to recalculate the feed time for the primary component and adjust the feed times for the other components.

Figure 7:
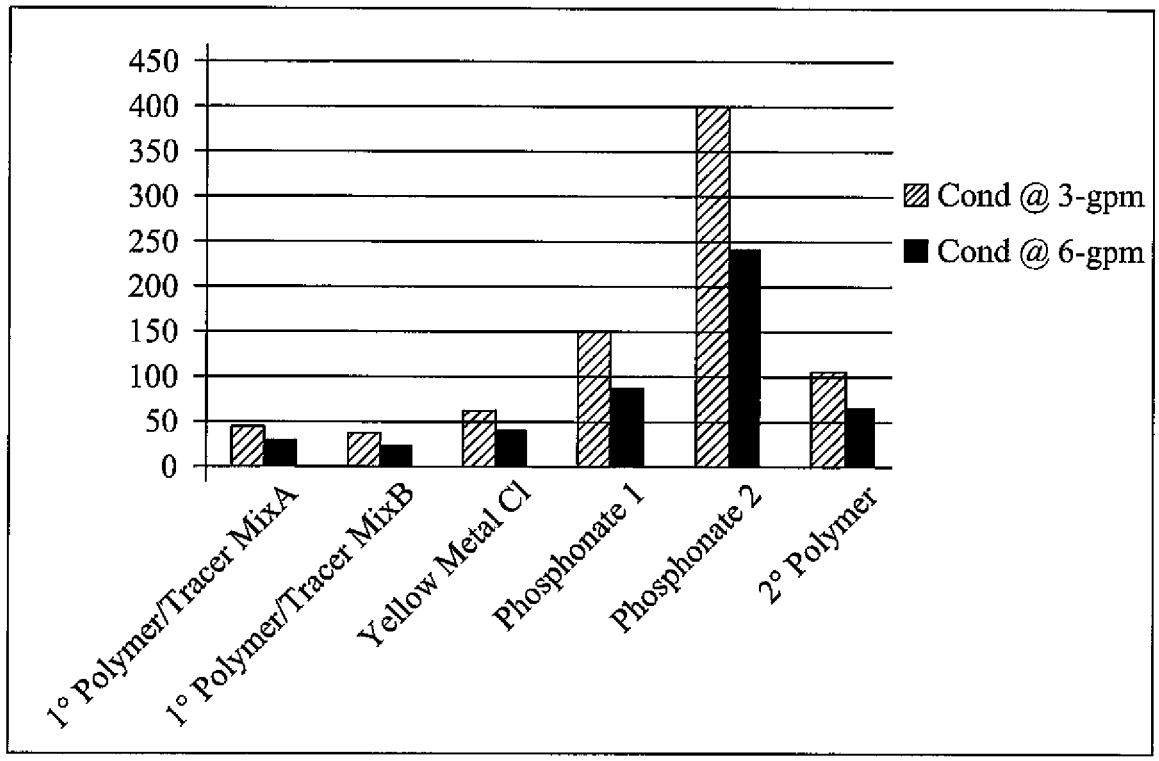
FIG. 7 is a chart showing conductivity readings for various treatment components fed at different flow rates.

PLC 14 or controller 114 preferably controls each pump 32, 132 so that treatment product components from each container 42, 142 are fed separately (not simultaneously) or sequentially, which allows for treatment delivery verification using a sensor 22, preferably a conductivity meter. PLC 14 is configured to receive a signal from conductivity meter 22 indicating the conductivity level of the water passing through the meter. When a treatment product is injected through manifold 20, the conductivity reading will change, which will indicate that the treatment product was injected. If the conductivity reading does not indicate that a treatment product has been injected when it was supposed to be, or that the proper amount of treatment product has been injected, PLC 14 may send an alert to a user through text, email, an alarm, or through a message sent to the water system controller or a remote computer monitoring station that treatment system 10 needs service to correct a malfunction (such as a malfunctioning pump) or that a treatment container 42 may be empty and need replacing. This functionality may also be incorporated into system 110 and controller 114. FIG. 7 shows a chart of conductivity readings from conductivity meter 22 of equivalent dilutions of treatment components fed at 1.8 ml/minute in 3 gpm and 6 gpm slip streams through manifold 20, showing that a conductivity meter is effective at indicating whether treatment has been injected and whether the proper amount of treatment has been injected in accordance with pre-determined feed rate functions. This may be particularly beneficial in allowing treatment system users to be alerted to a potential problem and to take remedial action before the lack of treatment (or lack of sufficient treatment) actually impacts with water system.

Separate, sequential feeding of each treatment product also helps avoid any inadvertent or undesired chemical interactions or incompatibilities between different treatment components. Separate feeding of individual treatment chemicals also provides greater flexibility in adjusting the water system treatment as needed based on changes in water chemistry, local regulations, or recommendations from consultants or engineers. As used herein, sequential feeding refers to feeding one treatment product by itself and then feeding another treatment product by itself, etc. so that the products are not simultaneously fed. The sequential feeding of the second product may be immediately after the conclusion of feeding the first product (a continuous sequential feeding) or there may be a time lapse between concluding the feeding of one product and initiating the feeding of another product.

Most preferably, PLC 14 or controller 114 also has treatment product inventory management capability. For example, a certain number of each container 42a, 42b, 42c, 142a, 142b, etc. containing the desired treatment products may be ordered for a particular water system. The initial amount in each container 42, 142 (e.g. 5 L) and, optionally, the number of containers for each treatment product contained in the supply shipment may be programmed into PLC 14 or controller 114 (or the water system controller). Product inventory may be managed by PLC 14 or controller 114 tracking the amount of treatment product injected from each container 42a, 42b, 142a, 142b, etc., calculating when each treatment container 42, 142 will be emptied based on current usage level and initial amount in the container, and sending a message to a remote user or the water system controller when the available level of treatment product reaches a predetermined low-level threshold, so that the container may be replaced or more closely monitored for replacement when emptied (or substantially emptied). PLC 14/controller 142 may also track the number of replacement containers 42, 142 being used as compared with the number received in the last shipment of treatment product to provide a message or alert that available inventory of any given treatment product is below a predetermined low threshold, so that the supply may be re-ordered to ensure there will be sufficient replacement containers 42, 142 available when needed. A small batch of replacement containers 42, 142 for each treatment product may then be ordered as needed.

Alternatively, PLC 14 or controller 114 may automatically send a replacement order to a predesignated supplier (or the replacement order may be sent by the water system controller) for any depleted or near depleted treatment product, with or without alerting a remote user that inventory is low. By using smaller sized containers 42, 142, preferably with non-hazardous forms of treatment products, shipping costs will be reduced both by weight of the product and by allowing use of non-hazardous shippers. In order to treat a 100 to 500 ton cooling system, for example, a case of 4 containers 42, 142 of 5 L each would weigh less than 75 pounds (likely around 56 pounds), so the shipping costs would be modest. Larger systems might require a larger package size, as will be understood by those of ordinary skill in the art. Although it is preferred to not use large drum (e.g. 55 gallon) size containers 42, 142 for ease of shipping, storage, and on-site handling, such larger containers may also be used with system 10, 110 by connecting the container 42 to ports 28 on housing 12 or a similar port on housing 112.

Although one sensor 22 and four pumps 32, four manifold ports 34, four containers 42, four sensors 21, and four connection ports 28 are shown and described with the preferred embodiments of treatment control system 10, other numbers of these pieces of equipment may also be used. Similarly, although 3 containers 142, 3 pump mechanisms, and 4 manifold ports are shown and described with preferred embodiments of system 110, other numbers of pieces of equipment may also be used. Most preferably, there is one pump, one manifold port, and one connection port for each container and there is one container for each treatment product (individually or each multi-component treatment product) to be used for a particular water system. Most preferably, downstream sensor 22 is in close proximity to the downstream side of the treatment product feeders (or manifold 20) and upstream sensor(s) 21 is in close proximity to the upstream side of the treatment product feeders (or manifold 20), to facilitate ease of connection to PLC 14 and to provide protection for the sensors inside housing 12. However, treatment control system 10 may utilize pre-existing sensors in the water system for the properties measured by sensors 21 and 22. System 110 may also be connected to pre-existing sensors in the water system and utilize data from those sensors. Any component, feature, method, or functionality described with respect to system 10 or 110 may also be used with the other system, as will be understood by those of ordinary skill in the art.

With respect to the AAP/HPA/other phosphonic acid treatment products for corrosion, white rust, and scale treatment according to preferred embodiment of the invention, several lab tests were run to test the effectiveness of these treatment products. The effectiveness of the AAP/HPA/other phosphonic acid treatment products according to the invention were evaluated using spinner tests to simulate flowing water over metal components in a water system. Each spinner test set-up comprises a stainless steel container of water with four metal coupons (mild steel coupons (C1010) and copper coupons (CDA 11) were used) suspended in the water in each container from holders hanging from a rotating shaft. The shaft rotates the coupons in the water in the stainless steel container at 147 rotations/min, representing a flow rate of 3-5 ft/s, depending on coupon distance from center of the rotating shaft. The initial volume of water used in each spinner test was characteristic of corrosive, low hardness water typically found in water systems. The water used had the characteristics shown in Table 1 below.

TABLE 1

Low hardness, corrosive water used in Spinner test experiments

| Characteristic | Value | Unit |
|---|---|---|
| pH | 8 to 8.5 | |
| Conductivity | 220 | cP |
| Ca Hardness | 30 | ppm, (as CaCO3) |
| Mg Hardness | 10 | ppm, (as CaCO3) |
| Chlorides, Total | 25 | ppm Cl |
| M Alkalinity | 30 | ppm, (as CaCO3) |
| Sulfate, Total | 28 | ppm, as SO4 |

During each spinner test the water is aerated and maintained at constant temperature of 120 F and constant volume (any evaporation is compensated with automatic addition of deionized water when water level drops below sensor level). Standard test duration is 48 hours.

Using the spinner test set-up, AAP/HPA/other phosphonic acid treatment products according to preferred embodiments of the invention (Example Nos. 1-3 including AAP, HPA, and another phosphonic acid—HEDP) without any added zinc or tin (as shown in Table 2) were compared to treatments using only zinc (Comp. Ex. 4), only tin (Comp. Ex. 5), only AAP (Comp. Ex. 6), only HPA (Comp. Ex. 7), HPA combined with tin (Comp. Ex. 8), and AAP combined with tin (Comp. Ex. 9) (all as shown in Table 3) as the primary inhibitor(s). The ppm concentrations of the various treatments are concentrations when added to the volume of water in the spinner test container. The treatments with zinc or tin were for comparison to those without. Zinc is typically used as corrosion inhibitor in water systems with highly corrosive water (low LSI). However its usage is undesirable due to toxicity issues and its use face regulations in some locations. Tin has been promoted and patented as a non-toxic alternative to zinc, but it is more expensive. In addition to the primary corrosion inhibitor components listed in Tables 2 and 3, all of the tests were carried out in the presence 4 ppm active AA/AMPS copolymer and 4 ppm active TTA. These ingredients were added to the water in each spinner test set-up to provide those concentration levels. In Examples 1 and 2, the AAP and HPA were separately added to the spinner test water and the other components (HDPE, AA/AMPS, TTA, caustic) were pre-mixed before adding to the spinner test water. In Example 3, all ingredients were pre-mixed as a composition before adding to the spinner test water. In each of Comparative Examples 4-9, the inhibitor was added to the water in the spinner test separately from any other ingredients, but HEDP was premixed with AA/AMPS, TTA, and caustic before adding to the water. The corrosion and pitting level for mild steel coupons after spinner tests in presence of different inhibitors are presented in FIG. 8.

TABLE 2

Corrosion inhibitor treatment products according to the invention

| Inhibitor | Unit | Example 1 | Example 2 | Example 3 |
|---|---|---|---|---|
| AAP (amino acid based polymer - such as a commercially available water solution containing about 40% of salt) | ppm active* | 7.5 | 5.2 | 5.2 |
| HPA (hydroxyphosphonoacetic acid) | ppm active | 2.5 | 5.0 | 5.0 |
| HEDP | ppm active | 3 | 3 | 3 |
| MEA | ppm | 0.25 | 1.0 | |
| Zn (zinc) | ppm active | N/A | N/A | N/A |
| Sn (tin) | ppm active | N/A | N/a | N/A |

*ppm active refers to the amount of active raw material, in contrast to ppm which refers to the weight of raw material in mg/L. For example, HPA is commercially available as a 50% water solution, so adding 10 ppm raw material will provide 5 ppm active HPA.

TABLE 3

Corrosion inhibitor treatment products - Comparative Examples

| Inhibitor | Unit | Comp. Ex 4 | Comp. Ex 5 | Comp. Ex 6 | Comp Ex 7 | Comp. Ex 8 | Comp. Ex 9 |
|---|---|---|---|---|---|---|---|
| AAP | ppm active | | | 15 | | | 7.5 |
| HPA | ppm active | | | | 5 | 5 | |
| HEDP | ppm active | 3 | 3 | 3 | 3 | 3 | 3 |
| MEA | ppm | | | | | | |
| Zn | ppm active | 1 | | | | | |
| Sn | ppm active | | 1 | | | 1 | 0.5 |

Spinner tests were run with each treatment at a flow rate equivalent to around 3 ft/second and at a flow rate equivalent to around 5 ft/second. A control test, without any treatment was also carried out for comparison. FIG. 8 shows photographs of a representative mild steel coupon after each spinner test with the control and with Example Treatment Products Nos. 1-9. The amount of corrosion and pitting on the coupons is shown in the photographs. As can be seen, the control coupons show extensive corrosion (dark areas on photographs). The coupons used with treatment products according to preferred embodiments of the invention (Ex. Nos. 2-3) show little, if any, corrosion or pitting (very few dark areas on photographs). The coupons used with Ex. No. 1, which contains all three components according to a preferred embodiment of the invention for corrosion inhibition, but only contains 2.5 ppm HPA (less than the more preferred amount of at least 3 ppm), shows improved results over the control and the comparative examples (Comp. Nos. 4-9), but shows slightly more corrosion than Ex. Nos. 2-3, where 5 ppm of HPA was used. The coupons used with the comparative treatments (Comp. Nos. 4-9) are significantly better than the control, but do show evidence of corrosion and pitting that is greater than with Ex. Nos. 1-3. Based on the results, it appears that the combination of AAP, HPA, and another phosphonic acid (in these examples, HEDP) interact synergistically to provide improved corrosion control, without requiring the use of zinc, tin or other regulated metals.

Some prior art water treatment corrosion inhibition treatments do not provide effective protection when oxidizing biocides are used in the same system to prevent biological growth. The most widely used oxidizing biocides are chlorine and stabilized bromine. Additional spinner corrosion tests were carried out using Example compositions Nos. 2 and 3 compared to comparative Example treatments Nos. 4 (zinc only) and 7 (HPA only) in the presence of a stabilized bromine biocide composition (commercially available as Chem-Aqua 42171). Example treatments 4 and 7 were selected because they showed the best results in the spinner tests of the comparative examples. Both Comp. Ex. Nos. 4 and 7 perform fairly well in low LSI water, but as discussed below, significantly worse when biocide is added. Also, Comp. Ex. No. 4 is based on zinc, which is undesirable to use due to toxicity concerns. As with the prior tests, these tests were carried out in presence 4 ppm active AA/AMPS copolymer and 4 ppm active TTA. A slug dose of 40 ppm of biocide was added at the beginning of each spinner test (after the corrosion inhibition treatment products were added and the test started) to yield about 1 ppm FHR (free halogen residue).

FIG. 9 shows photographs of a representative mild steel coupon after each spinner test with the Example Treatment Products in the presence of biocide. As can be seen, the coupons used with treatment products according to preferred embodiments of the invention (Ex. Nos. 2-3) show little, if any, corrosion or pitting, indicating that the functionality of preferred products according to the invention is not negatively affected by a biocide. The coupons used with the comparative treatment products (Comp. Ex. Nos. 4 and 7) show substantially more corrosion than with Ex. Nos. 2-3. It is noted that Comp. No. 7 was the use of HPA and HEDP, without any AAP, which showed good results without biocide, but significantly more corrosion occurred when a biocide was added. The comparative treatments having AAP and HEDP, without any HPA, (Comp. Ex. No. 6) did so poorly without biocide (FIG. 8) that it was not tested with biocide because the results would be expected to be even worse than in FIG. 8. Based on the results, it appears that the combination of AAP, HPA, and another phosphonic acid together interact synergistically to provide improved corrosion control even in the presence of a biocide and show improved results over the use of HPA alone.

Corrosion rates for the mild steel coupons were also measured and calculated from weight loss of the coupons. The results of both the spinner tests without added biocide and with added biocide are summarized in Table 4. Information on corrosion mode, particularly the presence of pitting (which is important in many applications and some corrosion inhibitors, including HPA used alone, are known to be poor protectors against pitting), is also included in Table 4. Most preferably, corrosion inhibitor treatment products according to the embodiments of the invention achieve corrosion rates of 3 MPY or less for corrosion, even in the presence of a biocide.

TABLE 4

Corrosion Rates form spinner test experiments
Mild Steel Coupon Corrosion Rate, MPY [mil/yr]

| | Low Hardness Water | | | Low Hardness Water + Biocide | |
|---|---|---|---|---|---|
| Test | 3 ft/sec | 5 ft/sec | Corrosion Pitting Scale | 3 ft/sec | 5 ft/sec Pitting |
| Control | 370 | 243 | N/A | | |
| Example 1 | 2.7 | 2.5 | None | | |
| Example 2 | 2.9 | 2.4 | None | 2.2 | 2.0 None |
| Example 3 | 2.5 | 2.5 | None | 2.7 | 2.4 None |
| Comp. Ex 4 | 2.7 | 2.7 | Limited | 8.0 | 11 Sever pitting |
| Comp. Ex 5 | 4.0 | 4.6 | Pitting | | |
| Comp. Ex 6 | 13.6 | 8.2 | Severe pitting | | |
| Comp. Ex 7 | 2.6 | 3.2 | Limited | 6.4 | 5.7 Severe pitting |
| Comp. Ex 8 | 3.9 | 5.2 | Pitting | | |
| Comp. Ex 9 | 3.8 | 3.2 | Sever pitting | | |

Pitting scale description:
None = no pitting observed
Limited = few (1-5) pitts per coupon, usually very shallow
Pitting = significant number of pits on coupons (5-50)
Sever pitting = a large number of pits (>50), usually dipper and larger The AAP/HPA/other phosphonic acid treatment products according to preferred embodiments of the invention contain organic phosphate from the HPA and from the other phosphonic acid used in these examples (HEDP). In the presence of a biocide, the organic phosphate is often reverted to orthophosphate, which is not as good in preventing corrosion or scale and also may cause issues with forming calcium phosphate scale. When the combination of AAP, HPA, and HEDP (or another phosphonic acid) is used as a corrosion inhibitor according to a preferred embodiment of the invention, virtually no reversion of organic phosphate to orthophosphate was detected. Samples from treatment product Example Nos. 2 and 3 and comparative Example No. 7 were tested for the presence of orthophosphates upon mixing of the treatment products and again after 48 hours. The results are listed below in Table 5. Example Nos. 2 and 3, which use AAP, HPA, and HEDP (and contain AA/AMPS and TTA as noted above), showed very little orthophosphate increase over the 48 hour period, but comparative Example No. 7 which contains HPA and HEDP (and contains AA/AMPS and TTA as noted above), but no AAP, showed a substantial increase.

TABLE 5

Orthophosphate levels in low hardness test water in presence of biocide during the spinner corrosion test

| Test | Orthophosphate (ppm PO4) | |
|---|---|---|
| | Initial | 48 hr (End of Test) |
| Example 2 | 0.4 | 0.5 |
| Example 3 | 0.2 | 0.4 |
| Comp. Ex -7 | 0.3 | 1.6 |

According to another preferred embodiment, water treatment products as listed in Table 6 (which is the same as Ex. 2 tested above) are effective at inhibiting corrosion and scale in a water system over a broad range of LSI values (−2.5 to >3) and in the presence of a biocide. The percentages listed are percentages for use with a pre-mixed composition, rather than individual treatment products separately added to a water system, but preferred amounts and ratios for separate addition of each ingredient may be easily determined based on these amounts.

TABLE 6

| Component | Wt % | Active %* in Pre-mixed Composition |
|---|---|---|
| Sodium polyasparte (AAP) | 13.0 | 5.2% as AAP |
| Hydroxy phosphonoacetic Acid (HPA) | 10.0 | 5.0% as HPA |
| 1-Hydroxyethylidene 1,1-diphosphonic acid (HEDP) or 2-phosphonobutane-1,2,4,tricarboxylic acid (PBTC) | 5.25-6.4 | 1.2-3.0% as $PO_4$ |
| Monoethanolamine (MEA) (optional) | 1.0 | 0.99% |
| Copolymer of acrylic acid and sulfonated monomer (AA/AMPS) | 8.78 | 3.9% as AA/AMPS |
| Tolyltriazole (TTA) | 9.40 | 4.0% as TTA |
| 1,3,6,8-Pyrenetetrasulfonic acid tetrasodium salt (PTSA) | 1.00 | 1% as PTSA |
| NaOH or KOH | 15.00-16.25 | N/A |
| Deionized water | 35.17-36.57 | N/A |

*Active % refers to active weight percent. Wt % is raw material weight percent. Most of the raw materials are aqueous solutions and contain only a certain amount of solids that is the actual chemical component. The amount of active (Active %) is calculated based on raw material weight percent and the amount of the chemical in the solution per the information provided by the supplier. For example, a commercially available source of AAP may be a 40% solution of AAP in water, so if 13% of that product is used, the active amount of AAP equals: 0.13*0.40*100% = 5.2% of AAP (active) in the formula NaOH and/or KOH is preferably also added to the pre-mixed composition according to an embodiment of the invention. These ingredients are typically added to water treatment formulations in order to neutralize acid and to bring the pH of the final pre-mixed composition to the desired level. Most of the pre-mixed compositions will have pH>8, some will have pH>12. In pre-mixed compositions where TTA is used (as with a preferred embodiment of a composition according to the invention) it is desirable to have higher pH (>11) for the composition in order to ensure solubility of TTA, which has very poor solubility at lower pH. Additionally, any individual treatment product may be neutralized, such as through the addition of NaOH or KOH in a container 42, 142 of the treatment product, to make the treatment product non-hazardous for shipping and storage purposes.

Figure 10:
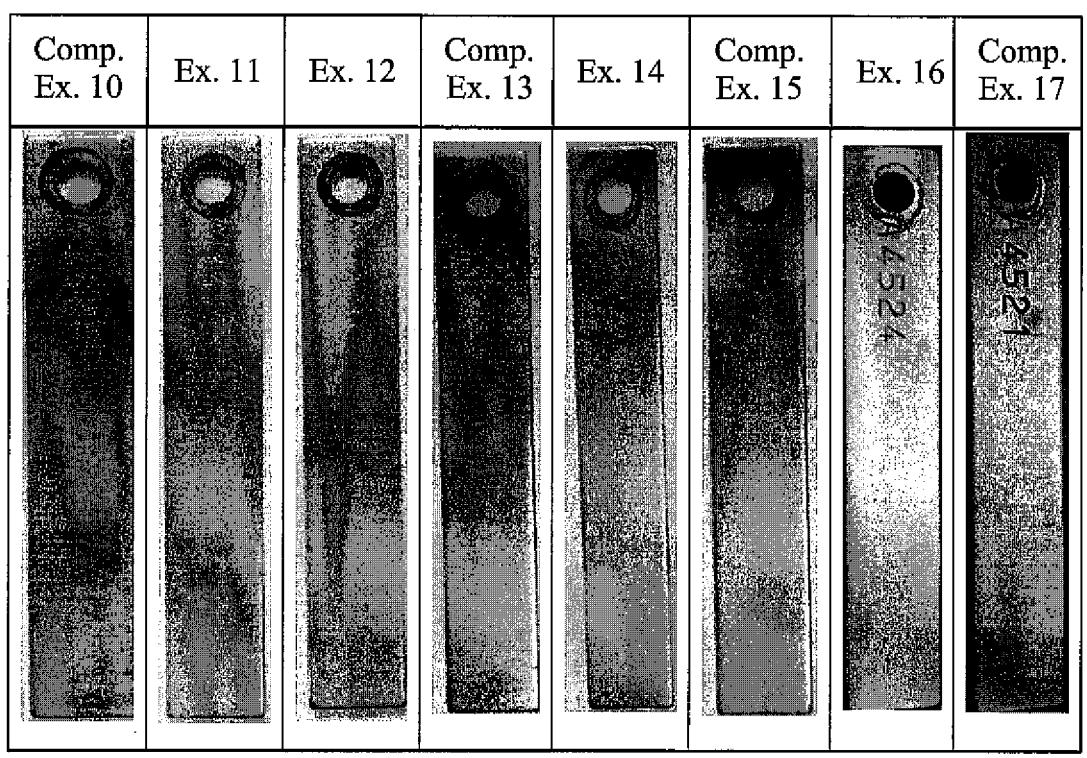
FIG. 10 contains photographs showing corrosion levels on steel coupons after spinner tests at a flow rate of 3 ft/sec.

Additional spinner tests in low LSI water were carried out in order to test the effectiveness of various concentrations of treatment products for inhibiting corrosion according to preferred embodiments of the invention. The same spinner test parameters and low LSI water (Table 1) described above were used for these tests. The concentrations of the ingredients when added to the spinner test water and the results of these tests are shown below in Table 7. FIG. 10 shows photographs of the test coupons (tested at a flow rate of 3 ft/sec) for each treatment after the test was completed.

TABLE 7

Additional Spinner Test Treatments & Results

| Inhibitor | Unit | Comp. Ex. 10 | Ex. 11 | Ex. 12 | Comp. Ex. 13 | Ex. 14 | Comp. Ex. 15 | Ex. 16 | Comp. Ex. 17 |
|---|---|---|---|---|---|---|---|---|---|
| AAP | ppm active | 2.6 | 5.2 | 7.8 | 5.0 | 10 | 10 | 5.0 | 5.0 |
| HPA | ppm active | 2.5 | 5.0 | 7.5 | 2.5 | 5 | 2.5 | 5.0 | 5.0 |
| AAP:HPA Ratio | | 51:49 | 51:49 | 51:49 | 67:33 | 67:33 | 80:20 | 51:49 | 51:49 |
| HEDP | ppm active | 1.6 (1.5 ppm $PO_4$) | 3.26 (3 ppm $PO_4$) | 4.7 (4.4 ppm $PO_4$) | 3.26 (3 ppm $PO_4$) | 3.26 (3 ppm $PO_4$) | 3.26 (3 ppm $PO_4$) | | |
| PBTC | ppm active | | | | | | | 2.6 (0.95 ppm $PO_4$) | |
| MEA | ppm | | | | 0.5 | 1 | 0.5 | | |
| TTA | ppm TTA | 4 | 4 | 4 | 4 | 4 | 4 | 4 | 4 |
| AA/AMPS Copolymer | ppm active | 4 | 4 | 4 | 4 | 4 | 4 | 4 | 4 |

TABLE 7-continued

Additional Spinner Test Treatments & Results

| Inhibitor | Unit | Comp. Ex. 10 | Ex. 11 | Ex. 12 | Comp. Ex. 13 | Ex. 14 | Comp. Ex. 15 | Ex. 16 | Comp. Ex. 17 |
|---|---|---|---|---|---|---|---|---|---|
| Corrosion Results from Spinner Test (low LSI water), mild steel (C1010) coupons at 3 ft/sec flow rate | | | | | | | | | |
| Corrosion Rate* | MPY (mil/yr) | 5.2 | 2.3 | 1.5 | 3.1 | 2.2 | 3.5 | 2.1 | 3.3 |
| Pitting | | Pitting | none | none | none | none | none | none | None |

*Average for 2 coupons from the same spinner test pot at 3 ft/sec

Comparative Examples 10, 13, and 15 use AAP, HPA, and HEDP but in amounts less than the preferred concentrations. These examples show increased corrosion (and Comp. Ex. 10 showed moderate pitting) at low levels of the inhibitors. Example Nos. 11-12, 14, and 16 according to preferred embodiments of the invention show good performance (low corrosion rate and no pitting) for different optional components and varying concentrations and ratios of AAP to HPA. The examples also show that the change from HEDP to PBTC (Ex. 16) and reduction of secondary chelates does not affect the corrosion inhibition performance of treatment products according to preferred embodiments of the invention. Example No. 17 used AAP and HPA, without a second phosphonic acid, similar to the composition described in the '023 patent. It shows improved results in controlling corrosion in low LSI water, but the results are not as good as in the examples according to preferred embodiments of the invention.

Additional spinner tests were conducted to compare treatments using AAP and PBTC as disclosed in the '023 patent with AAP/HPA/phosphonic acid treatment products according to preferred embodiments of the invention. The test set-up was the same as described above using low LSI water, mild steel (C1010) coupons, and a flow rate of 3 ft/sec. The results are shown in Table 8 below.

the comparative examples using only AAP and PBTC (without any HPA). It is also noted that Comp. Ex. Nos. 18-19 resulted in corrosion rates greater than 3 MPY even when using 20 ppm total inhibitor (AAP and PBTC), which is higher than the corrosion rate achievable with preferred treatment products according to the invention using substantially less total inhibitor, such as Example No. 11, which had a corrosion rate of 2.3 MPY using only 13.5 ppm total inhibitors (AAP, HPA, HEDP), and Example No. 16, which had a corrosion rate of 2.1 MPY using only 12.6 ppm total inhibitors (AAP, HPA, PBTC). Additionally, the corrosion rates of Comp. Ex. Nos. 18-19 are comparable to those in Comp. Ex. Nos. 13 and 15, which use AAP, HPA, and a second phosphonic acid, but the total amount of inhibitor needed to achieve the results in Comp. Ex. Nos. 18-19 (20 ppm total) is much higher than that needed in Nos. 13 and 15 (10.76 and 15.76 ppm total, respectively). The results of these experiments show that the addition of a second phosphonic acid, in combination with AAP and HPA, provides an unexpected synergistic effect that improves corrosion inhibition even when less total inhibitor is used and even in the presence of a biocide.

Those of ordinary skill in the art will understand that other suitable or equivalent chemical compounds and other treatment compounds, including other corrosion inhibitors, may

TABLE 8

Comparing Treatments Using One Phosphonic Acid to Treatments Using Two Phosphonic Acids

| Inhibitor | Unit | Comp. Example 18 80:20 PBTC/AAP | Comp. Example 19 40:60 PBTC/AAP | Example 20 | Example 21 | Example 12 (same as in Table 7) |
|---|---|---|---|---|---|---|
| PBTC | ppm active | 16 | 8 | 4.8 | 8 | |
| HEDP | ppm active | | | | | 4.7 |
| AAP | ppm active | 4 | 12 | 7.8 | 4 | 7.8 |
| HPA | ppm active | | | 7.5 | 8 | 7.5 |
| TTA | ppm TTA | 4 | 4 | 4 | 4 | 4 |
| AA/AMPS Copolymer | ppm active | 4 | 4 | 4 | 4 | 4 |
| Corrosion Rate* | MPY (mil/yr) | 3.1 | 3.1 | 1.9 | 1.7 | 1.5 |
| Pitting | | none | none | none | none | None |

*Average for 2 coupons from the same pot at 3 ft/sec

As can be seen, the examples according to preferred embodiments of the invention (Example Nos. 20, 21, and 12) with AAP, HPA, and a second phosphonic acid (HEDP or PBTC) show much better corrosion inhibition results than be substituted for any of the above ingredients or added to any of the above ingredients within the scope of this invention. AAP/HPA/phosphonic acid treatment products according to the embodiments of the invention are effective in inhibiting corrosion on metal components in water systems over a broad range of LSI values, including LSI<0, and without requiring the use of regulated toxic metals. The AAP/HPA/phosphonic acid treatment products are also effective at higher pH values (7-9) typically found in water systems, such as cooling towers and boilers, whereas some prior art inhibitors are ineffective or their effectiveness is reduced at such pH levels (for example, a polyaspartic acid/stannous salt treatment is effective only at pH 5-7). The use of AAP/HPA/phosphonic acid treatment products according to the invention also prevent reversion of organic phosphate to orthophosphate to maintain effectiveness in the presence of a biocide.

Other experiments using an electrochemical method were conducted to test AAP/HPA/phosphonic acid treatment products according to the invention for white rust prevention. The results in Table 9 below show synergistic effect of combining HPA and AAP (without another phosphonic acid) in reducing white rust formation as compared to use of each individual component (HPA alone and AAP alone). The cyclic voltammetry test was conducted in 0.1M sodium carbonate solution using zinc electrode. The measure of oxidation is the area under the oxidation curve peak observed; the lower the area the less oxidation occurs, meaning lower corrosion rate. The results are the averages of 6-10 experiments with standard deviation.

TABLE 9

| Inhibitor | Concentration [ppm active] | Measure of Oxidation [Coulombs*10$^{-3}$] |
|---|---|---|
| AAP | 50 | 1.2 ± 0.2 |
| HPA | 50 | 1.0 ± 0.1 |
| AAP/HPA (1:1 ratio) | 25:25 | 0.8 ± 0.1 |

Additional spinner corrosion tests were carried out in stainless steel containers in high alkalinity water known to form white rust on galvanized surfaces to test the effectiveness of treatment products according to preferred embodiments of the invention for the prevention of white rust formation. The water chemistry, characteristic of high alkalinity synthetic water, in these tests is detailed in Table 10 below. Four Hot Dip Galvanized steel coupons (HDG G70) with dimensions 1.0×4.0×0.02 in were installed in each container on the holders hanging from a rotating shaft that rotates at 147 rotations/min that represents flow rate of 3-5 ft/s, depending on coupon distance from center of the rotating shaft. During the tests the water was aerated and maintained at constant temperature of 120 F and constant volume (any evaporation was compensated with automatic addition of DI water when the water level dropped below a sensor level). Standard test duration was 48 hours. The active ingredients used in two comparative examples and three examples of preferred treatment products according to the invention, along with corrosion rates, are listed in Table 11.

TABLE 10

High alkalinity/no hardness water used in Spinner test experiments for white rust prevention

| Characteristic | Value | Unit |
|---|---|---|
| pH | 8.7-8.9 | |
| Conductivity | 2300 | cP |
| Ca Hardness | 0 | ppm, (as CaCO3) |
| Mg Hardness | 0 | ppm, (as CaCO3) |
| Chlorides, Total | 250 | ppm Cl |
| M Alkalinity | 200 | ppm, (as CaCO3) |
| Sulfate, Total | 500 | ppm, as SO4 |

TABLE 11

Active Ingredients and Galvanized Coupon Corrosion Rate

| Inhibitor | Unit | Comp. Ex. 22 - No Inhibitor | Comp. Ex. 23 | Ex. 24 | Ex. 25 | Ex. 26 |
|---|---|---|---|---|---|---|
| AAP | ppm active | — | — | 15 | 7.5 | 15 |
| HPA | ppm active | — | 7.5 | 7.5 | 2.5 | — |
| HEDP | ppm active | — | 3.26 (3 ppm PO$_4$) | 3.26 (3 ppm PO$_4$) | 3.26 (3 ppm PO$_4$) | 3.26 (3 ppm PO$_4$) |
| TTA | ppm TTA | — | 4 | 4 | 4 | 4 |
| AA/AMPS Copolymer | ppm active | — | 4 | 4 | 4 | 4 |
| Corrosion Results - Galvanized Coupons (HDG G70) | | | | | | |
| Corrosion Rate* | MPY (mil/yr) | 53.7 | 24.3 | 9.9 | 14.0 | 10.7 |

*Average for 4 coupons from the same pot (two at 3 ft/sec and two at 5 ft/sec flow rate)

In order to calculate the corrosion rate using the weight loss method, the galvanized coupons from these tests were cleaned according to standard procedure by immersing coupons in concentrated ammonium acetate and rinsing. FIG. 11 shows photographs of the galvanized coupons after the spinner tests with the treatment products described in Table 12, both before and after cleaning. The white deposit visible on the coupons before cleaning is white rust. The damage of the galvanized layer due to corrosion, shown as dark spots, is visible on the coupons after cleaning. The blank (Comp. Ex. 22—No Treatment) coupon was completely covered in white deposit and after cleaning most of the galvanized layer was removed with visible mild steel corrosion. The coupon treated with HPA and HEDP without an amino-acid based polymer (Comp. Ex. 23) showed substantial white rust formation, but was still a great improvement over the control (Comp. Ex. 22). Significantly better results were obtained with treatment products in Examples 24-26. The best results were achieved with Ex. 24 using AAP, HPA at greater than 3 ppm, and a second phosphonic acid (HEDP). Although the use of HPA is important in inhibiting mild steel corrosion, its use is optional for white rust treatment. As can be seen from Example 26, the results of using AAP and HEDP without HPA were almost as good as the three combined. Accordingly, a preferred pre-mixed composition for treating white rust according to the invention comprises 2-15% amino-acid based polymer, 0-10% HPA, and 0-10% of a second phosphonic acid. Preferably, the amount of active amino-acid based polymer in a treatment product according to the invention is at least 3 ppm, more preferably 3 ppm-50 ppm, and most preferably 5 ppm-30 ppm, all as initial concentrations when added to the volume of water in the water system being treated. More preferably, the AAP is used in conjunction with HPA in an amount of at least 3 ppm, more preferably from 3 ppm-50 ppm, and most preferably from about 3 ppm-20 ppm and/or another phosphonic acid in an amount of at least 2 ppm more preferably from 2 ppm-20 ppm, and most preferably from about 2 ppm-10 ppm.

For treating white rust according to the invention, it is preferred to use both hydroxyphosphonoacetic acid and an amino-acid based polymer, and more preferably in conjunction with a second phosphonic acid, in the weight range amounts indicated above, but it has also been found that the use of an amino-acid based polymer or hydroxyphosphonoacetic without the other is beneficial at inhibiting white rust.

A pilot cooling tower scale test using AAP/HPA/phosphonic acid treatment products according to a preferred embodiment of the invention was also conducted to test the ability to inhibit scale formation in high LSI water (LSI>1). The objective of the cooling tower scale test was to determine the number of cycles at which the tower can operate without scaling and the LSI limit of treatment in typical water with scaling characteristics as it cycles up. The cooling tower pilot test used 4 heat transfer surface rods and a DATS (Deposit Accumulation Testing System) operating at 800 Watts. The number of cycles of concentration (COC) is calculated as the ratio of concentration of any ions in the cooling tower water to the concentration of the same ion in makeup (starting) water. Conductivity ratio can also be used to calculate COC. It is desirable to operate at as high COC as possible to reduce water usage. Typically, the COC in a cooling tower is maintained at a certain level by measuring water conductivity, bleeding the system when conductivity increases over a set limit and adding more makeup water. The initial volume of water used in the cooling tower pilot test was characteristic of high LSI water having 100 ppm alkalinity as CaCO3 and 100 ppm calcium hardness as CaCO3 typically found in cooling tower water systems. The water used had the characteristics shown in Table 12 below.

TABLE 12

High LSI water used in Pilot Cooling Tower Scale Test

| Characteristic | Value | Unit |
| --- | --- | --- |
| pH | 8 | |
| Conductivity | 450-520 | µS |
| Ca Hardness | 100 | ppm, (as CaCO3) |
| Mg Hardness | 30 | ppm, (as CaCO3) |
| Chlorides, Total | 71 | ppm Cl |
| Total Alkalinity | 100 | ppm, (as CaCO3) |
| Total Hardness | 130 | ppm, (as CaCO3) |
| Sulfate, Total | 30 | ppm, as SO4 |
| LSI at 60° C. | 1.1 | |

Scale is indicated when the HTR (Heat Transfer Resistance) suddenly increases above stable level and exceed $12 \times 10^{-6}$ $Cm^2/W$ and/or heater % clean drops below 97% (as determined from the Heater Transfer coefficient fouled (UF) and clean (UC) values, where UF=1/HTR Scaled+UC and % Cleanliness=UF/UC×100). The LSI limit (the LSI measurement at which scale will form) can also be determined by monitoring changes in water chemistry, water turbidity and visually by observing scale formation. A pre-mixed AAP/HPA/phosphonic acid composition according to Table 6 at a concentration of 100 ppm (when added to the water in the pilot cooling tower system) was found to increase the operational limit of cooling tower to 6 COC and LSI of 3.2 based on HTR and water chemistry data. The pilot cooling tower was operated for 7 days before scale began forming. The test was started with high scaling water, LSI around 1, and was cycled up to 6 COC, which increased LSI to 3.2 before scale began to form.

For comparison, a typical prior art scale treatment, such as Chem-Aqua 31155 (which contains PBTC, sodium tolytriazole, sodium polyacrylate, polymaleic acid (sodium salt) and sodium hydroxide), at the same 100 ppm concentration allows to operate cooling tower only 3 COC that is at LSI limit of only 2.6. Even at double the treatment concentration (200 ppm) of Chem-Aqua 31155, the COC in cooling tower can only be increased to 3.4, with LSI limit of 2.85, which is well under the COC increase and LSI limit achieved using a preferred embodiment of the treatment products of the invention. In another experiment using the same treatment products used in the previous pilot cooling tower scale test at 50 ppm (when added to the water in the pilot cooling tower system), the system reached 4.3 COC and LSI of 2.84 before scale began to form. These results further indicate that this three component formula is far better at scale prevention that prior art formulas containing PBTC, even when the prior art formulas are used at 2 to 4 times the concentration. With AAP/HPA/phosphonic acid treatment products according to the invention, water in the water system (such as a cooling tower) may be cycled/recirculated more times before scale formation begins compared to prior art treatments. This provides substantial savings on water, since there will be less blow-down and less make-up water added to the water system.

According to one preferred method of preventing corrosion of metal components and/or white rust on galvanized steel components and/or mineral scale formation in a water system, AAP/HPA/phosphonic acid treatment products according to the invention as described above are contained in containers 42a, 42b, 42c (with any other optional or other treatment products in additional containers 42) of delivery and control system 10. System 10 adds each of these treatment products to the water system at an effective feed rate.

For corrosion and white rust inhibition, one or more of the AAP, HPA, and another phosphonic acid as described above are fed into the water simultaneously or substantially simultaneously at an effective total feed rate of 20 ppm-600 ppm, or more preferably 100-300 ppm, depending on the treated water chemistry and the amount of optional components also added. Preferably, a sufficient amount of is the AAP/HPA/phosphonic acid treatment products are added by system 10 to the water system to provide effective active amounts of one or more of the three treatment components (depending on whether white rust is being treated or both corrosion and white rust) of at least 3 ppm AAP, at least 3 ppm HPA, and at least 2 ppm of another phosphonic acid, each as initial concentrations when added to the volume of water in the water system being treated. More preferably, the AAP/HPA/phosphonic acid treatment products are added by system 10 in sufficient amounts to provide effective active amounts one or more of the components of between 3 ppm-50 ppm AAP, between 3 pm-50 ppm HPA, and between 2 ppm-20 ppm of another phosphonic acid when added to the water in the water system. Most preferably, these effective active amounts are 5 ppm-30 ppm AAP, 3 ppm-20 ppm HPA, and 2 ppm-10 ppm other phosphonic acid when added to the water in the water system. For treating white rust, the use of HPA is optional, so system 10 may not include a container 42 of HPA or may include a container 42 of HPA but be programmed to not add it to the water system each time AAP is added, only added AAP in amounts sufficient to provide the above concentration ranges of AAP in the water of the water system being treated.

For scale inhibition, one or more of the AAP, HPA, and another phosphonic acid as described above are fed into the water by system 10 simultaneously or substantially simultaneously at an effective total feed rate of 20 ppm-600 ppm, or more preferably 50-300 ppm, depending on the treated water chemistry and the amount of optional components that may be added along with the AAP/HPA/other phosphonic acid treatment products. Preferably, a sufficient amount of AAP/HPA/phosphonic acid treatment products are added to the water system to provide effective active amounts of one or more of the three treatment components of at least 2 ppm AAP, at least 2 ppm HPA, and at least 1.5 ppm of another phosphonic acid, each as initial concentrations when added to the volume of water in the water system being treated. More preferably, the treatment products are added in a sufficient amount to provide effective active amounts of the three treatment components of 2 ppm-50 ppm AAP, 2 ppm-50 ppm HPA, and 1.5 ppm-20 ppm of another phosphonic acid, each as initial concentrations when added to the volume of water in the water system being treated. Most preferably, the treatment products are added by system 10 in a sufficient amount to provide effective active amounts of the three components of between 3 ppm-30 ppm AAP, between 2 pm-20 ppm HPA, and between 1.5 ppm-10 ppm of another phosphonic acid when added to the water in the water system According to another preferred embodiment, (for treating corrosion, white rust, and/or scale) a fluorescent tracer is included with one of the AAP/HPA/phosphonic acid treatment products so that the level of that treatment product in the water system can be measured and monitored. A fluorescent tracer may also be a separate treatment product in its own container 42 added simultaneously with one or more of the AAP/HPA/phosphonic acid treatment products. Additional amounts of the AAP/HPA/phosphonic acid treatment products are added to the water system as needed, based on the tracer measurements, to maintain an effective amount of treatment within the water system.

All ppm concentrations of the various treatments in the example tests described herein are concentrations when added to the water in the spinner test, to correlate to the concentrations when added to the water in the water system being treated. Unless specifically excluded, all references to acids herein and in the claims include water soluble salts of the acid, as will be understood by those of ordinary skill in the art.

References herein to calculating or measuring a value, parameter, or property and the like are intended to include any form of direct measurement, converting data or a signal, making a calculation based on one or more data points or signals, or otherwise comparing, interpreting, correlating, or manipulating one or more data points or signals. Those of ordinary skill in the art will also appreciate upon reading this specification and the description of preferred embodiments herein that modifications and alterations to the device may be made within the scope of the invention and it is intended that the scope of the invention disclosed herein be limited only by the broadest interpretation of the appended claims to which the inventors are legally entitled.

We claim:

1. A method of controlling treatment of a water system comprising water, the method comprising the steps of:
providing two or more containers, each containing an initial volume of one of a plurality of treatment products;
wherein each container is connectable to a feeder using one or more connection components to feed the treatment product from that container to the water system and;
providing a controller configured to send signals to the feeders and to receive data or signals from one or more optional sensors located upstream or downstream of the feeders, the controller having a plurality of programmed functions for activating and deactivating the feeders and wherein there is at least one programmed function to control a feed initiation and a feed rate for each treatment product through its feeder;
activating each feeder according to the programmed function associated with its treatment product to deliver an amount of each treatment product to the water system to achieve a desired initial concentration level for each treatment product in the water system;
wherein there is a set of matching visual indicators associated with each container, the visual indicators of each set being disposed on or near two or more of the container, its feeder, or at least one of the corresponding connection components to allow connection of each container with the correct feeder associated with the programmed function for the treatment product in the container; and
wherein each treatment product is useful alone or in combination with another treatment product for treating one or more of corrosion, white rust, scale, or biological contamination in the water system.

2. The method according to claim 1 further comprising measuring a first parameter of the water using a first of the one or more sensors and verifying that at least one of the treatment products was fed to the water system in accordance with the programmed function for that treatment product based on the data or signal from the first sensor.

3. The method according to claim 2 wherein the feeders are activated separately so that no treatment product from one feeder is fed into the water system simultaneously with a treatment product from another feeder.

4. The method according to claim 2 wherein the measured first parameter is conductivity.

5. The method according to claim 2 further comprising comparing the data or signal received related to the first parameter to pre-programmed data to determine whether the amount of treatment product fed into the water system is in accordance with the programmed function associated with that treatment product.

6. The method according to claim 5 further comprising sending an alert message or activating an alarm when the comparison indicates that treatment product has not been fed into the water system according to the programmed function associated with the treatment product.

7. The method according to claim 2 further comprising sending an alert message or activating an alarm when the verifying step indicates that at least one of the treatment products has not been fed into the water system.

8. The method according to claim 2 further comprising measuring a second parameter of the water using a second of the one or more sensors, wherein the second sensor is disposed upstream of the feeders, sending data or a signal from the second sensor to the controller, and utilizing the data or signal from the second sensor as an input in at least one of the programmed functions;
wherein the second sensor is inline fluorimeter, a pH meter, a conductivity meter, a flow meter, a flow switch, temperature sensor, an ORP sensor, or a sensor to monitor oxidant level: and wherein the first sensor is disposed downstream of the feeders.

9. The method according to claim 2 wherein the measured first parameter is a concentration of a first treatment product in the water system and wherein at least one of the programmed functions is a calculation of feeder activation time for a second treatment product based on a desired concentration level for the second treatment product in the water system, the measured concentration level for the first treatment product in the water system, and actual feeder activation time for the first treatment product to achieve that measured concentration level.

10. A method of controlling treatment of a water system comprising water, the method comprising the steps of:
providing a first container containing an initial volume of a first treatment product;
providing a second container containing an initial volume of a second treatment product;
optionally providing one or more additional containers, each containing an initial volume of one of a plurality of additional treatment products;
wherein each container is connectable to a feeder using one or more connection components to feed the treatment product from that container to the water system;
providing a controller connected to the feeders, the controller having one or more programmed functions to control a feed initiation and a feed rate for each treatment product through its feeder;
activating each feeder according to the programmed function associated with its treatment product to deliver an amount of each treatment product to the water system to achieve a desired initial concentration level for each treatment product in the water system; and
tracking a total feed amount for each treatment product based on the feeder activation time and feed rate, comparing the initial volume of each treatment product in its container to its respective total feed amount to determine a remaining volume for each treatment product, and sending an alert or activating an alarm when the remaining volume for any treatment product is below a first predetermined threshold; and
wherein each treatment product is useful alone or in combination with another treatment product for treating one or more of corrosion, white rust, scale, or biological contamination in the water system;
wherein the first treatment product comprises an amino-acid based polymer (AAP), the second treatment product comprises a phosphonic acid other than hydroxyphosphonoacetic acid (HPA), and a third treatment product comprises HPA to treat corrosion, white rust, scale, or a combination thereof in the water system; and
wherein the one or more programmed functions control the feed rates of the AAP, phosphonic acid or its water soluble salt, and HPA to provide active initial concentrations in the water system and wherein the active initial concentrations in the water system are (1) at least 2 ppm AAP, at least 2 ppm HPA, and at least 1.5 ppm of the phosphonic acid other than HPA when it is desired to treat scale; or (2) at least 3 ppm AAP, at least 3 ppm HPA, and at least 2 ppm of the phosphonic acid other than HPA when it is desired to treat corrosion; or (3) at least 3 ppm AAP and at least 2 ppm of the phosphoric acid other than HPA when it is desired to treat white rust; and wherein the AAP includes water soluble salts thereof, the phosphonic acid includes water soluble salts thereof, and the optional HPA includes water soluble salts thereof.

11. The method according to claim 10 further comprising tracking the number of containers of each treatment product used or replaced and comparing an initial inventory amount of containers of that treatment product to its respective number of containers used or replaced to determine a remaining number of containers of that treatment product in inventory, and sending an alert or automatically ordering replacement inventory when the remaining number of containers for any treatment product is below a second predetermined threshold.

12. The method according to claim 1 wherein each treatment product is in a concentrated liquid form and is for treating a single water system issue, and wherein at least one of the treatment products is in a non-hazardous form.

13. The method according to claim 1 wherein each treatment product comprises only one active ingredient for treating the water and each treatment product is in a concentrated liquid form, and wherein at least one of the treatment products is in a non-hazardous form.

14. The method according to claim 1 wherein a first treatment product comprises a single active ingredient and a second treatment product comprises a single active ingredient that is different from the first treatment product, and wherein at least one of the first or second treatment products is in neutralized form.

15. The method according to claim 1 wherein each treatment product comprises a different active ingredient.

16. The method according to claim 1 wherein a first treatment product comprises an amino-acid based polymer (AAP), a second treatment product comprises a phosphonic acid other than hydroxyphosphonoacetic acid (HPA), and an optional third treatment product comprises HPA to treat corrosion, white rust, scale, or a combination thereof in the water system;
wherein the one or more programmed functions control the feed rates of the AAP, phosphonic acid, and optional HPA to provide active initial concentrations in the water system and wherein the active initial concentrations in the water system are (1) at least 2 ppm AAP, at least 2 ppm HPA, and at least 1.5 ppm of the phosphonic acid other than HPA when it is desired to treat scale; or (2) at least 3 ppm AAP, at least 3 ppm HPA, at least 2 ppm of the phosphonic acid other than HPA when it is desired to treat corrosion; or (3) at least 3 ppm AAP, optionally at least 3 ppm HPA, and at least 2 ppm of the phosphonic acid other than HPA when it is desired to treat white rust; and
wherein the AAP includes water soluble salts thereof, the phosphonic acid includes water soluble salts thereof, and the optional HPA includes water soluble salts thereof.

17. The method according to claim 16 wherein the active initial concentrations in the water system are (1) between 2-50 ppm AAP, between 2-50 ppm HPA, and between 1.5-20 ppm of the phosphonic acid other than HPA when it is desired to treat scale; or (2) between 3-50 ppm AAP, between 3-50 ppm HPA, and between 2-20 ppm of the phosphonic acid other than HPA when it is desired to treat corrosion; or (3) between 2-50 ppm AAP, optionally between 3-50 ppm HPA, and between 2-20 ppm of the phosphonic acid other than HPA when it is desired to treat white rust.

18. The method according to claim 16 wherein the active initial concentrations in the water system are (1) between 3-30 ppm AAP, between 2-20 ppm HPA, and between 1.5-10 ppm of the phosphonic acid other than HPA when it is desired to treat scale; or (2) between 5-30 ppm AAP, between 3-20 ppm HPA, and between 2-10 ppm of the phosphonic acid other than HPA when it is desired to treat corrosion; or (3) between 5-30 ppm AAP, between 3-20 ppm HPA, and between 2-10 ppm of the phosphonic acid other than HPA when it is desired to treat white rust.

19. The method according to claim 16 wherein the one or more programmed functions also controls the activation time so that the AAP, phosphonic acid other than HPA, and optional HPA are fed into the water system substantially simultaneously or in substantially immediate sequential succession.

20. The method according to claim 16 wherein the fourth treatment product comprises a biocide and wherein another programmed function controls the activation time for feeding the biocide so that it is fed substantially simultaneously or in substantially immediate sequential succession to one or more of the AAP, phosphonic acid other than HPA, and optional HPA.

21. The method according to claim 1 wherein a first treatment product comprises a single active ingredient and a second treatment product comprises a single active ingredient different from the first treatment product.

22. The method according to claim 1 wherein the feed rate for at least one treatment product is calculated by the controller based on duration of time a valve connected to the container for that treatment product is opened, duration of time a pump for the feeder for that treatment product is on, a flow meter reading, or a combination thereof.

23. The method according to claim 2 wherein the first sensor is disposed downstream of the feeders and further comprising comparing the data or signal received from the first sensor to pre-programmed data or recorded measurements to determine whether a selected treatment product has been fed into the water system in accordance with the programmed function associated with that treatment product;
sending an alert message or activating an alarm when the comparison indicates that treatment product has not been fed into the water system in accordance with the programmed function associated with that treatment product;
measuring a second parameter of the water upstream of the feeders using a second of the one or more sensors;
sending data or a signal from the second sensor to the controller;
utilizing the data or signal from the second sensor as an input in at least one of the programmed functions; and
wherein the second sensor is inline fluorimeter, a pH meter, a conductivity meter, a flow meter, a flow switch, temperature sensor, an ORP sensor, or a sensor to monitor oxidant level.

24. The method according to claim 23 wherein the feed rate for one or more of the treatment products is adjusted based on the data or signal from the second sensor.

25. The method according to claim 23 wherein the feed rate for the selected treatment product is adjusted based on the comparing step.

26. The method according to claim 1 wherein at least one of the programmed functions is based on a combination of (1) a timer and (2) the data or signal from a first of the one or more sensors located downstream of the feeders or data or a signal from a second of the one or more sensors located upstream of the feeders or both.

27. The method according to claim 26 wherein a first programmed function for a first treatment product is based on the timer and on the data or the signal from the second sensor; and
wherein the second sensor is (1) a water meter on a bleed line or make-up water line for the water system or (2) a fluorimeter.

28. The method according to claim 27 wherein the first programmed function determines a first feed time for the first treatment product and wherein a second programmed function for a second treatment product determines a second feed time for the second treatment product based on a ratio of the first feed time and specific gravity values for the first and second treatment products.

29. The method according to claim 1 wherein the set of matching visual indicators associated with one container is different from the set of matching visual indicators associated with each other container.

30. The method according to claim 1 wherein the treatments products are all in non-hazardous form.

31. The method according to claim 1 wherein the treatment products are all in neutralized form.

32. The method according to claim 11 wherein there is a set of matching visual indicators associated with each container, the visual indicators of each set being disposed on or near two or more of the container, its feeder, or at least one of the corresponding connection components to allow connection of each container with the correct feeder to receive signals from the controller associated with the programmed function for the treatment product in the corresponding container; and
wherein the set of matching visual indicators for associated with each container is different from the set of matching visual indicators of each other container.

33. The method according to claim 11 wherein the treatments products are all in non-hazardous form.

34. The method according to claim 11 wherein the treatment products are all in neutralized form.

35. The method according to claim 10 wherein the active initial concentrations in the water system are (1) between 3-30 ppm AAP, between 2-20 ppm HPA, and between 1.5-10 ppm of the phosphonic acid other than HPA when it is desired to treat scale; or (2) between 5-30 ppm AAP, between 3-20 ppm HPA, and between 2-10 ppm of the phosphonic acid other than HPA when it is desired to treat corrosion; or (3) between 5-30 ppm AAP, optionally between 3-20 ppm HPA, and between 2-10 ppm of the phosphonic acid other than HPA when it is desired to treat white rust; and
wherein the one or more programmed functions also controls the activation time so that the AAP, phosphonic acid other than HPA, and optional HPA are fed into the water system substantially simultaneously or in substantially immediate sequential succession.

36. The method according to claim 10 wherein the feed rate for at least one treatment product is calculated by the controller based on duration of time a valve connected to the container for that treatment product is opened, duration of time a pump for the feeder for that treatment product is on, a flow meter reading, or a combination thereof.

37. The method according to claim 36 wherein the feed initiation comprises opening a valve, activating a pump, or a combination thereof.

38. The method according to claim 1 wherein the feed initiation comprises opening a valve, activating a pump, or a combination thereof.

39. The method according to claim 30 wherein the treatment products comprise at least one of the following: a phosphonate, a triazole comprising a glycol solution, butyl benzyl triazole, and chlorotriazole.

40. The method according to claim 31 wherein the treatment products comprise at least one of the following: a phosphonate, a triazole comprising a glycol solution, butyl benzyl triazole, and chlorotriazole.

41. The method according to claim 33 wherein the treatment products comprise at least one of the following: a phosphonate, a triazole comprising a glycol solution, butyl benzyl triazole, and chlorotriazole.

42. The method according to claim 34 wherein the treatment products comprise at least one of the following: a phosphonate, a triazole comprising a glycol solution, butyl benzyl triazole, and chlorotriazole.

43. The method according to claim 1 wherein each set of matching visual indicators comprises a color or a shape or a combination thereof.

44. The method according to claim 29 wherein each set of matching visual indicators comprises a color or a shape or a combination thereof.

45. The method according to claim 32 wherein each set of matching visual indicators comprises a color or a shape or a combination thereof.

46. The method according to claim 1 wherein each treatment product is in a concentrated liquid form and at least one of the plurality of treatment products comprises (1) a polymer at a pH of 2.5 to 11, (2) a phosphonate at a pH of 2.5 to 11, or (3) a triazole in a glycol solution.

47. The method of claim 1 wherein at least one of the plurality of treatment products comprises a triazole in a 25-50% propylene glycol solution.

* * * * *